US012724822B2

(12) United States Patent
Gonzalez-Banos et al.

(10) Patent No.: US 12,724,822 B2
(45) Date of Patent: Sep. 1, 2026

(54) MONTAGING SYSTEM

(71) Applicant: Insightful Mechanisms LLC, Mountain View, CA (US)

(72) Inventors: Hector H. Gonzalez-Banos, San Mateo, CA (US); Ramya Narasimha, San Francisco, CA (US); Max McFarland, Lake Oswego, OR (US)

(73) Assignee: Insightful Mechanisms LLC, Mountain View, CA (US)

( * ) Notice: Subject to any disclaimer, the term of this patent is extended or adjusted under 35 U.S.C. 154(b) by 225 days.

(21) Appl. No.: 18/660,610

(22) Filed: May 10, 2024

(65) Prior Publication Data

US 2025/0348540 A1 Nov. 13, 2025

(51) Int. Cl.
*G06T 7/73* (2017.01)
*G06F 16/787* (2019.01)
(Continued)

(52) U.S. Cl.
CPC .............. *G06F 16/787* (2019.01); *G06T 7/20* (2013.01); *G06T 7/73* (2017.01); *H04N 7/188* (2013.01);
(Continued)

(58) Field of Classification Search
CPC . G06F 16/787; G06T 7/20; G06T 7/73; G06T 2207/10016; H04N 7/188; H04N 23/6812; H04N 23/698; H04N 23/66
See application file for complete search history.

(56) References Cited

U.S. PATENT DOCUMENTS 9,318,023 B2 4/2016 Moshchuk et al.
10,571,926 B1 2/2020 Zhang et al.
(Continued)

FOREIGN PATENT DOCUMENTS

CN 108694882 B 9/2020
CN 112200863 A * 1/2021 .............. G01C 9/00
(Continued)

OTHER PUBLICATIONS

Bancroft et al., "Data Fusion Algorithms for Multiple Inertial Measurement Units", Article in Sensors (www.mdpi. com/journal/ sensors, doi: 10.3390/s110706771 ), Jun. 29, 2011, pp. 6772-6798, 11(7), MDPI, Basel, Switzerland.
(Continued)

*Primary Examiner* — Carol W Chan
(74) *Attorney, Agent, or Firm* — Asif Ghias

(57) ABSTRACT

Montaging techniques are disclosed that utilize non-sequential visual inertial odometry (VIO) performed on non-sequential/unordered capture data collected by a capture apparatus. The capture apparatus is carried by an observer/inspector at a site during a walkthrough/inspection. The capture apparatus comprises one or more cameras and an inertial measurement unit (IMU). User markings are applied to portions of the capture data. Based on the non-sequential VIO, a velocity profile and subsequently a set of positions of the capture apparatus are estimated as it was carried by the observer/inspector during the walkthrough/inspection. The above is accomplished via a constrained integration that utilizes constraints conditioning the motion of the capture apparatus. A montage of the capture data is produced that suits the needs of a given application of the instant montaging technology.

27 Claims, 15 Drawing Sheets

(51) Int. Cl.

| | |
|---|---|
| ***G06T 7/20*** | (2017.01) |
| ***H04N 7/18*** | (2006.01) |
| ***H04N 23/66*** | (2023.01) |

(52) U.S. Cl.
CPC ... *H04N 23/66* (2023.01); *G06T 2207/10016* (2013.01)

(56) References Cited

U.S. PATENT DOCUMENTS

| | | | | |
|---|---|---|---|---|
| 10,907,971 | B2 | 2/2021 | Roumeliotis et al. | |
| 10,953,545 | B2 | 3/2021 | Hong et al. | |
| 11,030,478 | B1 | 6/2021 | Devitt et al. | |
| 11,188,787 | B1 | 11/2021 | Ulbricht et al. | |
| 11,380,362 | B2 | 7/2022 | Huang | |
| 11,399,531 | B1 | 8/2022 | Sibley et al. | |
| 11,496,723 | B1 | 11/2022 | Nepveu et al. | |
| 11,521,332 | B1 | 12/2022 | Chen et al. | |
| 11,544,867 | B2 | 1/2023 | Zhang et al. | |
| 11,573,562 | B2 | 2/2023 | Bachrach et al. | |
| 2011/0282622 | A1 | 11/2011 | Canter | |
| 2012/0065871 | A1 | 3/2012 | Deshpande et al. | |
| 2013/0138264 | A1 | 5/2013 | Hoshizaki et al. | |
| 2014/0114561 | A1 | 4/2014 | Pakzad et al. | |
| 2015/0022640 | A1 | 1/2015 | Metzler et al. | |
| 2015/0331111 | A1 | 11/2015 | Newman et al. | |
| 2016/0140729 | A1 | 5/2016 | Soatto et al. | |
| 2018/0192035 | A1 | 7/2018 | Dabeer et al. | |
| 2018/0315209 | A1 | 11/2018 | Murphy-Chutorian et al. | |
| 2019/0041858 | A1 | 2/2019 | Bortoff et al. | |
| 2019/0347783 | A1 | 11/2019 | Salgian et al. | |
| 2020/0217666 | A1 | 7/2020 | Zhang et al. | |
| 2021/0213973 | A1 | 7/2021 | Pena et al. | |
| 2021/0247781 | A1 | 8/2021 | Liu et al. | |
| 2022/0026920 | A1 | 1/2022 | Afrouzi et al. | |
| 2022/0066456 | A1 | 3/2022 | Afrouzi et al. | |
| 2022/0217499 | A1 | 7/2022 | Hasecke et al. | |
| 2022/0277164 | A1 | 9/2022 | Malayath | |
| 2022/0319014 | A1* | 10/2022 | Meitav | G06T 3/4007 |
| 2022/0398775 | A1 | 12/2022 | Streem et al. | |
| 2022/0404830 | A1 | 12/2022 | Jobanputra et al. | |
| 2022/0414919 | A1 | 12/2022 | Tyagi et al. | |
| 2023/0003188 | A1 | 1/2023 | Vermillion et al. | |
| 2023/0052288 | A1 | 2/2023 | Mani et al. | |
| 2023/0062186 | A1 | 3/2023 | Measel et al. | |
| 2023/0103297 | A1 | 4/2023 | Savikovsky et al. | |
| 2023/0105428 | A1* | 4/2023 | Brown | G01C 21/1656 |
| 2023/0392944 | A1 | 12/2023 | Kimia | |

FOREIGN PATENT DOCUMENTS

| | | | | |
|---|---|---|---|---|
| CN | 115479602 A | | 12/2022 | |
| WO | WO-2021242809 A1 | * | 12/2021 | G06V 10/16 |
| WO | WO-2024112351 A1 | * | 5/2024 | G06T 7/80 |

OTHER PUBLICATIONS

Company-Corcoles et al., "MSC-VO: Exploiting Manhattan and Structural Constraints for Visual Odometry", Article in IEEE Robotics And Automation Letters, Jan. 13, 2022, pp. 2803-2810, 7(2), Institute of Electrical and Electronics Engineers, Piscataway, Nj, USA.

Corke, "Roll-pitch-yaw angles", blog post on PeterCorke.com (https://petercorke.com/robotics/roll-pitch-yaw-angles/), Aug. 4, 2018, pp. 1-2, PeterCorke.com website by ZEPHYMEDIA (https://www.zephyrmedia.com.au/), Bundall, Queensland, Australia.

Dynamics, "Rigid bodies", webpage from Dynamics reference, Dec. 12, 2021, pp. 1-6, University of Illinois, Urbana-Champaign, Il, USA.

Eberly, "Approximations to Rotation Matrices and Their Derivatives", web publication by Geometric Tools (https:// www.geometrictools.com/), Aug. 12, 2020, pp. 1-39, Geometric Tools, Redmond, Wa, USA.

Freescale Semiconductor, "Freescale Sensor Fusion for Kinetis Product Development Kit User Guide", User Gude by Freescale Semiconductor, Sep. 1, 2014, pp. 1-46, Freescale Semiconductor, Austin, Tx, USA.

Freescale Semiconductor, "Freescale Sensor Fusion Library for Kinetis", Datasheet by Freescale Semiconductor, Sep. 1, 2014, pp. 1-44, Freescale Semiconductor, Austin, Tx, USA.

Hou, "Modeling Inertial Sensors Errors Using Allan Variance", Master thesis, Department of Geomatics Engineering, University of Calgary, Sep. 1, 2004, pp. 1-147, Department of Geomatics Engineering, University of Calgary, Calgary, Canada.

Hover et al., "Rate of Change of Euler Angles", Section 9.4.1 of MIT Courseware, System Design for Uncertainty (https://eng.libretexts.org/@go/page/47274), Sep. 6, 2021, pp. 1-1, LibreTexts Engineering (online educational resource project - libretexts.org), Davis, Ca, USA.

Li et al., "Accelerometer-Based Gyroscope Drift Compensation Approach in a Dual-Axial Stabilization Platform", Article in Electronics (doi: 10.3390/electronics8050594), May 27, 2019, pp. 1-12, 8(594), MDPI (www.mdpi.com/journal/ electronics), Basel, Switzerland.

Malvezzi et al, "Train Position and Speed Estimation by Integration of Odometers and IMUs", paper in 9th World Congress on Railway, May 22, 2011, pp. 22-26, 9th World Congress on Railway, Lille, France.

Mathworks, "Orientation from accelerometer and gyroscope readings", webpage on mathworks.com (https://www.mathworks.com/help/fusion/ref/imufilter-system-object.html), Sep. 24, 2021, pp. 1-10, WathWorks, Natick, MA, USA.

Paina et al, "Experimental comparison of Kalman and complementary filter for attitude estimation", Paper in conference XII Argentine Symposium on Technology (AST 2011)(XL JAIIO), Aug. 29, 2011, pp. 1-11, Cordoba, Argentina.

Pedley et al, "Aerospace, Android and Windows 8 Coordinate Systems (orientation.c)", Technical Note from Freescale Semiconductor, Dec. 1, 2014, pp. 1-27, Freescale Semiconductor, Austin, TX, USA.

Pedley et al, "Basic Kalman Filter Theory", Technical Note from Freescale Semiconductor, Sep. 1, 2014, pp. 1-13, Freescale Semiconductor, Austin, TX, USA.

Pedley et al, "Calculation of Orientation Matrices from Sensor Data", Technical Note from Freescale Semiconductor, Sep. 1, 2014, pp. 1-25, Freescale Semiconductor, Austin, TX, USA.

Pedley et al, "Freescale Sensor Fusion Kalman Filter (fusion.c)", Technical Note from Freescale Semiconductor, Sep. 1, 2014, pp. 1-25, Freescale Semiconductor, Austin, TX, USA.

Pedley et al, "Magnetic Calibration (magnetic.c)", Technical Note from Freescale Semiconductor, Sep. 1, 2014, pp. 1-27, Freescale Semiconductor, Austin, TX, USA.

Pedley et al, "Matrix and Vector Algebra (matrix.c)", Technical Note from Freescale Semiconductor, Sep. 1, 2014, pp. 1-15, Freescale Semiconductor, Austin, TX, USA.

Pedley et al, "Quaternion Algebra and Rotation Quaternions", Technical Note from Freescale Semiconductor, Sep. 1, 2014, pp. 1-17, Freescale Semiconductor, Austin, TX, USA.

Pedley et al, "Trigonometry Approximations (approximations.c)", Technical Note from Freescale Semiconductor, Sep. 1, 2014, pp. 1-6, Freescale Semiconductor, Austin, TX, USA.

Pedley, "Tilt Sensing Using a Three-Axis Accelerometer", Technical Document from Freescale Semiconductor, Mar. 1, 2013, pp. 1-22, Freescale Semiconductor, Austin, TX, USA.

Pizarro et al., "Automatic floor plan analysis and recognition", Article in Automation in Construction, Aug. 1, 2022, pp. 1-20, 140, 104348, Department of Computer Science, Department of Civil Engineering, Universidad de Chile, Chile.

Rasmussen et al., "Gaussian Processes for Machine Learning (Adaptive Computation and Machine Learning series)", Appendix B of Book, ISBN: 026218253X, Nov. 23, 2005, pp. 207-219, The MIT Press, Boston, MA, USA.

Riley Jr, "Handbook of Frequency Stability Analysis", Publication by Hamilton Technical Services (www.lulu.com as ID # 508588 ), Mar. 7, 2007, pp. 1-158, Hamilton Technical Services, Beaufort, SC, USA.

(56) References Cited

OTHER PUBLICATIONS

Roetenberg et al, "Compensation of Magnetic Disturbances Improves Inertial and Magnetic Sensing of Human Body Segment Orientation", IEEE Transactions on Neural Systems and Rehabilitation Engineering, Sep. 12, 2005, pp. 395-405, 13(3), Institute of Electrical and Electronics Engineers, Piscataway, NJ, USA.
Salmony, "IMU Attitude Estimation", webpage on philsal.co.uk, Sep. 24, 2021, pp. 1-13, city unknown, UK.
Slabaugh, "Computing Euler angles from a rotation matrix", Article, Aug. 6, 2000, pp. 1-7, Queen Mary University of London, London, UK.
Sorkine-Hornung et al, "Least-Squares Rigid Motion Using SVD", publication of Department of Computer Science, ETH Zurich, Jan. 16, 2017, pp. 1-5, ETH Zurich, Zurich, Switzerland.
Stanley, "Statistics gathered from build #420 of the sensor fusion library", Technical Note from Freescale Semiconductor, Sep. 1, 2014, pp. 1, Freescale Semiconductor, Austin, TX, USA.
St Microelectronics, "iNEMO inertial module: 3D accelerometer, 3D gyroscope, 3D magnetometer", Datasheet (DocID025715 Rev 3), Mar. 1, 2015, pp. 1-72, St Microelectronics, Santa Clara, CA, USA.
TDK, "Premium Performance 6-Axis Motion Tracking IMU", TDK Document No. DS-000367 , Revision: 1.0, Rev. Date: Mar. 2, 2020 (www.invensense.com), Mar. 2, 2020, pp. 1-102, TDK Corporation, San Jose, CA, USA.
Timmer et al, "On Generating Power Law Noise", Artcile in Astronomy and Astrophysics, Aug. 1, 1995, pp. 707-710, v. 300, EDP Sciences, Les Ulis, France.
Titterton et al., "Strapdown Inertial Navigation Technology", Chapter 3 of Book, ISBN: 0863413587, Oct. 29, 2004, pp. 17-57, Institution of Engineering and Technology, Stevenage, UK.
Vagner, "MEMS Gyroscope Performance Comparison Using Allan Variance Method", Doctoral Thesis in Proceedings of the 17th Conference Student EEICT, Jan. 1, 2011, pp. 199-203, Faculty of Electrical Engineering and Communication, Brno University of Technology, Brno, Czech Republic.
Welch et al, "An Introduction to the Kalman Filter", Technical Report TR 95-041, Jul. 24, 2006, pp. 1-16, Department of Computer Science, University of North Carolina at Chapel Hill, Chapel Hill, NC, USA.
Wikipedia, "Gauss-Markov process", Wikipedia page, Jul. 5, 2023, pp. 1-2, Wikipedia Foundation Inc., San Francisco, CA, USA.
Woodman, "An introduction to inertial navigation", Technical Report published by the University of Cambridge (ISSN 1476-2986, No. UCAM-CL-TR-696), Aug. 1, 2007, pp. 1-37, University of Cambridge, Cambridge, UK.
Yasin, "GyroBias Math Review", Article, pp. 1-4, MindFolds Technology LLP, Bangalore, India.
Zhang et al, "Allan Variance Analysis on Error Characters of MEMS Inertial Sensors for an FPGA-based PS/INS System", Artcile in Proceedings of the International Symposium on GPS/GNNS, Nov. 11, 2008, pp. 127-133, University of New South Wales, NSW, Sydney, Australia.
PCT-US2025-024903_IntSrchRprt_672025009061996.
PCT-US2025-024903_WO_672025009062032.

* cited by examiner

Fig. 8

MONTAGING SYSTEM

FIELD OF THE INVENTION

This invention generally relates to the field of montaging and more specifically to automation benefits derived from montaging.

BACKGROUND

It is commonly believed that the cameras of today can accurately depict the world "as it is", and that as the quality of image sensors and lenses improve, so does the fidelity of the cameras in showing what the world is. One could argue that in the future, cameras will be so advanced and affordable that we could readily use them to observe and document any environment or situation we want. However, even with flawless sensors, cameras would still not reflect reality "as it is". Cameras narrate a visual story according to the framing decided by the director, cinematographer, videographer, video editor, or even as implicitly dictated by their placement.

Through his film editing technique Kuleshov Effect, Lev Kuleshov demonstrates the necessity of a montage as the basic or fundamental tool in cinema. Cinema consists of fragments and the assembly of those fragments. The content of the images is not necessarily what is important but rather its combination. This is why the Academy Award for Best Film Editing exists.

Now let us consider the context of capturing visual evidence in manufacturing, construction, retail, or any other business setting. Just placing cameras is not enough. Simply recording volumes of raw video footage is not enough. Instead, one desires to "focalize" the visual evidence on what is relevant or pertinent to the business setting. For example, casinos want cameras directly above the gambling tables, retailers want visual records organized around point of sales transactions, or around key-fob entries in access control systems.

The necessity of a montage is thus true not just for cinema but also for any application that requires visual records. Montaging is the arranging of media elements into a unified composition or presentation that serves a given purpose. From this perspective, the camera output is merely raw material. It becomes a useful visual record once a human or an algorithm organizes videos and images around elements of the ontology that is relevant to the application. We refer to this as being focalized. Here we use the term ontology in the information science sense: the representation, formal naming and definitions of the categories, properties, and relations between the concepts, data, or entities that are pertinent to a subject or application.

Blueprints and floorplans are the organizing principle in architecture, engineering, and construction (AEC). The use of building information modeling (BIM) software is prevalent in this industry. In fact, it is a standard. ISO 19650-1:2018 defines BIM as: Use of a shared digital representation of a built asset to facilitate design, construction, and operation processes to form a reliable basis for decisions. A person having ordinary skill in the art (POSA) knows that BIM is fundamentally based on blueprints and floorplans.

Notice the term "operation processes" in the ISO 19650-1:2018 standard. This wording appears because BIM software is often used to manage non-construction projects also. BIM can be used in any project where participants need to share a common representation of a facility (i.e., floorplans and blueprints). Warehousing, equipment inventory, and retooling in manufacturing are some of such non-construction examples.

In AEC and related projects, the facility or environment is constantly changing, and these changes need to be periodically inspected. This is often done using photography. A POSA understands that such inspection involves more than just taking pictures with a camera. Said pictures must also be uploaded to the project management software, organized in collections, and located within the blueprint or floorplan.

Inspections or walkthroughs in small projects e.g., home construction, apartment remodeling, require low or moderate effort. But in large projects, this can become a tedious and error-prone activity if performed manually. Consider a 20-floor commercial building where the same architectural details often repeat throughout the building (even within the same floor). An inspector will have a hard time organizing and locating the photos just based on their recollection.

This challenge is demonstrated by workflow 10 of the prior art as illustrated in FIG. 1. More specifically, the process begins at block or step 12 where an inspector visits a site and takes as many pictures as practicable. Once back from the inspection or walkthrough, the inspector inserts the memory card or a universal serial bus (USB) drive from the camera to a computer. Ideally, the inspector was able to or remembered to bring the laptop to the site for this purpose. The above is shown by block 14. Then as shown by block 16, the inspector transfers the files to the laptop, and erases the old files in the camera. Now, the inspector transfers the pictures to a remote location or to a web-based project management software. Often, however, there is limited network connectivity on the site, so this must be done long after the inspection took place.

Then the inspector needs to organize the pictures relying on memory. In other words, the inspector does the organization of the captured data while relying on his/her memory to recall details about the path that he/she took during the walkthrough. This is shown by block 18. As illustrated by block 20, the inspector adds or places or pastes the pictures to the blueprint of the site of the inspection. They now need to ensure that they have an updated or latest copy of the blueprint as it is subject to revisions. At this stage the inspector shows the blueprint along with the pictures to a manager or supervisor or foreman shown in block 22.

The supervisor may now ask the inspector for any number of unanticipated questions. For example, the supervisor may ask the inspector to add his/her notes and voice recordings to the blueprint also. This can be a frustrating situation because the inspector may not anymore recall all the relevant details about the sections or parts of the inspection. This is especially true if the inspection was conducted at some time significantly in the past and/or the site is complex with many floors and sections, such as a commercial building. The inspector may now have to resort to add voice memos and other notes after the fact based on memory. The accuracy of such additions is now suspect. Moreover, they may have no other choice than to conduct the inspection again!

There is plenty of prior art that attempts to address some of the challenges in the field. U.S. Pat. No. 11,188,787 B1 to Ulbricht et al. discloses systems, methods, and computer readable media for implementing an end-to-end room layout estimation. A room layout estimation engine performs feature extraction on an image frame to generate a first set of coefficients for a first room layout class and a second set of coefficients for a second room layout class. Afterwards, the room layout estimation engine generates a first set of planes according to the first set of coefficients and a second set of planes according to the second set of coefficients. The room layout estimation engine generates a first prediction plane according to the first set of planes and a second prediction plane according to the second set of planes. Afterwards, the room layout estimation engine merges the first prediction plane and the second prediction plane to generate a predicted room layout for the room.

U.S. Patent Publication No. 2023/0392944 A1 to Kimia teaches a wearable device for estimating a location of the device within a space. The device comprises a plurality of cameras mounted to a structure, with at least a portion of the structure being adapted to facilitate a user wearing the device. The plurality of cameras have substantially fixed positions and orientations on the structure relative to each other. At least one processor is configured to receive image data from the plurality of cameras, perform feature detection on the image data to obtain a first plurality of features from the image data, and determine an estimate of the location of the device in the space. This is done based at least in part, on a location associated with a second plurality of features obtained from image data previously captured from the space that matches the first plurality of features.

U.S. Patent Publication No. 2022/0066456 A1 to Afrouzi et al. discloses a method for operating a robot, including capturing images of a workspace, capturing movement data indicative of movement of the robot and capturing LIDAR data as the robot performs work within the workspace. The method further compares at least one object from the captured images to objects in an object dictionary, identifies a class to which the at least one object belongs and then generates a first iteration of a map of the workspace based on the LIDAR data. The method then generates additional iterations of the map based on newly captured LIDAR data and newly captured movement data. It then actuates the robot to drive along a trajectory that follows along a planned path by providing pulses to one or more electric motors of wheels of the robot. It then localizes the robot within an iteration of the map by estimating a position of the robot based on the movement data, slippage, and sensor errors.

U.S. Patent Publication No. 2019/0041858 A1 to Bortoff et al. teaches a system for controlling a motion of a vehicle from an initial state to a target state. The system includes a path planner to determine a discontinuous curvature path connecting the initial state with the target state by a sequential composition of driving patterns. The discontinuous curvature path is collision-free within a tolerance envelope centered on the discontinuous curvature path. The system further includes a path transformer to locate and replace at least one treatable primitive in the discontinuous curvature path with a corresponding continuous curvature segment to form a modified path remaining within the tolerance envelope. Each treatable primitive is a predetermined pattern of elementary paths. The system further includes a controller to control the motion of the vehicle according to the modified path.

U.S. Pat. No. 10,907,971 B2 to Roumeliotis et al. teaches a vision-aided inertial navigation system that comprises an image source to produce image data for poses of reference frames along a trajectory, a motion sensor configured to provide motion data of the reference frames, and a hardware-based processor configured to compute estimates for a position and orientation of the reference frames for the poses. The processor executes a square-root inverse Schmidt-Kalman Filter (SR-ISF)-based estimator to compute, for features observed from poses along the trajectory, constraints that geometrically relate the poses from which the respective feature was observed. The estimator determines, in accordance with the motion data and the computed constraints, state estimates for position and orientation of reference frames for poses along the trajectory and computes positions of the features that were each observed within the environment. Further, the estimator determines uncertainty data for the state estimates and maintains the uncertainty data as a square root factor of a Hessian matrix.

U.S. Pat. No. 11,380,362 B2 to Huang discloses systems and methods provide for editing of spherical video data. In one example, a computing device can receive a spherical video (or a video associated with an angular field of view greater than an angular field of view associated with a display screen of the computing device), such as by a built-in spherical video capturing system or by acquiring the video data from another device. The computing device can display the spherical video data. While the spherical video data is displayed, the computing device can track the movement of an object (e.g., the computing device, a user, a real or virtual object represented in the spherical video data, etc.) to change the position of the viewport into the spherical video. The computing device can generate a new video from the new positions of the viewport.

U.S. Patent Publication No. 2016/0140729 A1 to Soatto et al. teaches a method for improving the robustness of visual-inertial integration systems (VINS) based on derivation of optimal discriminants for outlier rejection, and the consequent approximations that are purportedly both conceptually and empirically superior to other outlier detection schemes used in this context. They argue that VINS is central to a number of application areas including augmented reality (AR), virtual reality (VR), robotics, autonomous vehicles, autonomous flying robots, and so forth and their related hardware including mobile phones, such as for use in indoor localization (in GPS-denied areas), and the like.

In the article entitled "Train Position and Speed Estimation by Integration of Odometers and IMUs", authors Monica Malvezzi et al. summarize the main features of an odometry algorithm to be used in modern Automatic Train Protection and Control (ATP/ATC) systems. They argue that the availability of a reliable speed and travelled distance estimation is fundamental for the efficiency and the safety of the whole system. They investigate the integration of odometers and an IMU (Inertial Measurement Unit) in the position and speed estimation process. Their objective is to increase the accuracy of the odometric estimation, especially in critical adhesion conditions. The preliminary results show a significant improvement of position and speed estimation performance. Their paper presents the criteria to fuse the information from the different sensors. Then a set of test results showing the improvement of the estimation process are presented and discussed.

Despite the plethora of prior art and while keeping the above-described challenges of the field in mind, what is needed is a system and method for creating montages of captured data or content that can serve a variety of purposes. Such techniques, absent from the prior art, would need to "remember" the walkthrough and organize the captured content from being "in time" to a montage that organizes it "in space" for a given application. What is also needed are systems and methods of montaging that can capture content in any arbitrary order, estimate the positions/path of the observer and create a montage of the content as desired. Such systems and methods, absent from the prevailing art, would accrue a number of field automation (FA) benefits for a variety of industries.

OBJECTS OF THE INVENTION

In view of the shortcomings of the prior art, it is an object of the invention to capture unordered or non-sequential capture data using a capture apparatus carried by a user during a walkthrough.

It is also an object of the invention to perform non-sequential visual inertial odometry (VIO) on the capture data to estimate positions of the capture apparatus during the walkthrough.

It is also an object of the invention to fit the estimated positions as a path onto a blueprint associated with the site where the walkthrough was performed.

It is further an object of the invention to visualize the estimated path by overlaying it onto the blueprint.

It is also further an object of the invention for the capture device to be an on-off device (OOD).

It is also an object of the invention for the capture apparatus to be an always-on device (AOD).

Still other objects and advantages of the invention will become apparent upon reading the summary and the detailed description in conjunction with the drawing figures.

SUMMARY OF THE INVENTION

A number of objects and advantages of the invention are achieved by apparatus and methods of montaging by employing non-sequential visual inertial odometry (VIO) performed on one or more portions of capture data. The capture data is produced by a capture apparatus carried by a user or an observer or an operator during a capture session at a site. Depending on the application of the present technology, the capture session may be referred to as a walkthrough or an inspection and the user may also be referred to as an inspector. According to the instant design, the capture data is non-sequential because it consists of one or more unordered portions that are collected in an arbitrary order.

The capture data is specifically produced by one or more cameras and an inertial measurement unit (IMU) contained in/on the capture apparatus. Consequently, the capture data consists of video footage generated by camera(s) and IMU measurements or IMU data measured by the IMU. The capture data is recorded or stored locally onboard the capture apparatus and uploaded to a remote storage when there is network connectivity between the capture apparatus and the remote storage. Preferably, the remote storage is in the cloud.

There are also one or more markings that are applied to the portions of capture data by the user. The markings are applied in a number of ways and serve a number of purposes. In one embodiment, the user markings or simply markings are entered by the user as waypoints indicating reference points or specific points of interest during the walkthrough or the capture session. Preferably, such waypoint markings indicate the start and end of the walkthrough. Preferably, the waypoint markings designate a pause or stop undertaken by the user during the walkthrough.

Preferably still, the waypoint markings identify a reference point that is optically derived from a fiducial marker or a landmark at the site. Preferably still, the markings are applied by the user to designate certain portions of capture data to be excluded from uploading to the remote storage. Preferably still, the markings are applied by the user to designate certain portions of capture data to be skipped from downstream processing and hence from inclusion in the montage produced per below.

There are also one or more applied constraints that condition the motion of the user in the walkthrough and in turn the motion of the capture apparatus. Preferably, one or more of these constraints are based on or derived from the above markings. Preferably, these constraints are based on corrections entered by the user for fitting estimated positions of the capture apparatus to an underlying blueprint/floorplan/architectural layout of or associated with the site. Preferably, one or more of these constraints are based on a reference point derived from a landmark or a fiducial marker at the site. Preferably still, one or more of these constraints are derived from a pause or stop detected in the motion of the capture apparatus. Preferably still, one or more of these constraints are based on a known compass point or heading at the site.

The present design estimates the velocity profile of the motion of the capture apparatus during the walkthrough based on non-sequential VIO. The above user markings are utilized in this process. The benefits of instant non-sequential VIO are accrued by first determining a partial orientation of the capture apparatus. The partial orientation comprises its roll ($\phi$) and pitch ($\theta$) with respect to the gravity plane, its angular velocity $d\psi/dt$ (about the gravity vector) and its velocities in the three dimensions or 3-D ($v_x$, $v_y$, $v_z$). The collection of ($v_x$, $v_y$, $v_z$) estimates for an entire set of discrete samples is referred to as the velocity profile. Based on the instant principles, the above kinematic quantities can be estimated using non-sequential or sparse visual data.

Now, the position of the capture apparatus in 3-D and its remaining orientation are obtained by a constrained integration of $d\psi/dt$ and velocity profile i.e. ($v_x$, $v_y$, $v_z$). This is done by utilizing the above-discussed constraints conditioning the motion of the capture apparatus. The result is a set of positions of the capture apparatus (and its remaining orientation) while undergoing motion during the walkthrough or capture session. By performing non-sequential VIO on the unordered/non-sequential portions of capture data, the present technology thus estimates the positions of the capture apparatus as it was carried by the user during the capture session/walkthrough/inspection.

The above-estimated set of positions of the capture apparatus are then used to create a montage of the capture data according to the requirements of a given application. For AEC applications, the set of positions trace the estimated path of the capture apparatus during the inspection. The montage of capture data produced for such AEC embodiments preferably uses the estimated path (algorithmically) fit to a blueprint or floorplan associated with the site. More specifically, the path is fit to a specific section or folio/page of the site where the inspection was performed. The above fit is then visualized on a computer screen by overlaying the estimated path onto the blueprint.

The non-sequential VIO is preferably performed on an appropriately provisioned backend. Preferably, the backend is in the cloud and is based on a serverless architecture, such as, Amazon AWS® Lambda. Depending on the embodiment, the capture apparatus may be an on-off device (OOD) or an always-on device (AOD). When the capture apparatus is an OOD, the user can define the start and end of the inspection by simply starting and stopping the device at the beginning and the end of the inspection respectively. Alternatively, when the capture apparatus is an AOD, the user can retrospectively define the start and end of the inspection in the non-sequential capture data ex post facto. In either case, the above is accomplished by the user by applying respective waypoint markings to the capture data, and specifically to its portions.

In a preferred embodiment, the user provides manual inputs and corrections for performing the above fit/fitting of the estimated path to the blueprint. These user corrections are used as constraints conditioning the motion of the capture apparatus and employed in the above-discussed constrained integration. In a related embodiment, the fit or fitting is based on a confidence measure that is derived from the non-sequential VIO.

In a highly preferred embodiment, the user orders the unordered portions of capture data before the above estimation of velocity profile is performed. The above-discussed user markings are employed for such ordering. In another embodiment, the user also carries a secondary device, such as a smartphone for taking pictures at desired points during the walkthrough and for including those pictures in the non-sequential capture data. In a related embodiment, the user can also include text and/or voice memos recorded at the desired points during the walkthrough and include them in the capture data.

The camera on the capture apparatus is preferably a 360-degree camera to record a 360-degree video and the montage produced is a 360-degree virtual tour. In another embodiment, the montage produced is a hyperlapse. In another embodiment, the camera is in an array of standard or non-360-degrees cameras on the capture apparatus for recording a 360-degree video. It is noted that having a 360-degree or an omnidirectional video coverage is not a requirement of the present technology.

In another preferred embodiment, the capture apparatus is mounted on a helmet worn by the user, or in other words is head-mounted to the user. In an alternative embodiment, the user carries the capture apparatus on a monopod or a “stick”. In another embodiment, the user also carries a companion device to conveniently issue commands to the capture apparatus. The companion device is particularly useful if the capture apparatus is head-mounted to the user or is otherwise not conveniently accessible during the capture session. The present technology offers a large variety of choices for the secondary device and the companion device above. These include a smartphone, a smartwatch, a tablet, a mobile computing device, a laptop, a wearable device, a personal digital assistant (PDA) or any other suitable computing device.

There is a rich array of functionality afforded by the computer applications of the present technology for organizing and managing walkthroughs in the system. For AEC embodiments, these include assigning an inspection to the site where the inspection was performed. More particularly, the assignment is to an individual section or folio of the site where the inspection was performed. Explained further, the inspection is assigned to the blueprint of the section of the site to which the estimated path of the capture apparatus is fit per above. In related embodiments, a given capture apparatus or camera or IMU is preassigned to a site/section. After the pre-assignment, any data captured by the capture apparatus is automatically assigned to that site/section.

The present technology also supports multiple observers or users each carrying a capture apparatus or sharing one or more capture apparatus. Such team of observers/inspectors can collaborate to perform a walkthrough of a large project. Depending on the embodiment, the montage produced combines the estimated positions of the capture apparatus from different users/observers/inspectors either individually or collectively.

The montaging systems and apparatus of the present technology comprising: (a) a capture apparatus containing a camera and an inertial measurement unit (IMU); (b) computer-readable instructions stored in non-transitory storage media and at least one microprocessor coupled to said non-transitory storage media for executing said computer-readable instructions, said at least one microprocessor configured to: (c) collect one or more portions of capture data produced by said capture apparatus carried by a user undergoing motion at a site during a capture session; (d) allow said user to apply one or more markings to said one or more portions; (e) apply one or more constraints conditioning said motion; (f) perform an estimation of a velocity profile of said capture apparatus from said one or more portions by employing non-sequential visual inertial odometry (VIO) and by utilizing said one or more markings; (g) determine a plurality of positions of said capture apparatus by performing a constrained integration of said velocity profile based on said one or more constraints; and (h) produce a montage of said capture data based on said plurality of positions.

The montaging systems and apparatus of the present design further comprise: (a) one or more capture apparatus each containing a camera and an inertial measurement unit (IMU); (b) computer-readable instructions stored in non-transitory storage media and at least one microprocessor coupled to said non-transitory storage media for executing said computer-readable instructions, said at least one microprocessor configured to: (c) collect one or more portions of capture data produced by each of said one or more capture apparatus carried by one or more respective users each undergoing motion at a site during a capture session; (d) allow each of said one or more respective users to apply one or more markings to said one or more portions; (e) apply one or more constraints conditioning said motion; (f) perform an estimation of a velocity profile of each of said capture apparatus from said one or more portions by employing non-sequential visual inertial odometry (VIO) and by utilizing said one or more markings; (g) determine a plurality of positions of each of said capture apparatus by performing a constrained integration of said velocity profile based on said one or more constraints; and (h) produce a montage of said capture data based on said plurality of positions.

The computer-implemented montaging methods of the present design comprise the steps of: (a) collecting one or more portions of capture data produced by a capture apparatus carried by a user undergoing motion at a site during a capture session, said capture apparatus comprising a camera and an inertial measurement unit (IMU); (b) applying one or more markings by said user to said one or more portions; (c) applying one or more constraints conditioning said motion; (d) estimating a velocity profile of said capture apparatus from said one or more portions by employing non-sequential visual inertial odometry (VIO) and by utilizing said one or more markings; (e) determining a plurality of positions of said capture apparatus by performing a constrained integration of said velocity profile based on said one or more constraints; and (f) producing a montage of said capture data based on said plurality of positions.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

FIG. 1 illustrates a workflow depicting the challenges of the prior art.

FIG. 2 provides a block diagram of the main embodiments of the present technology.

FIG. 8 shows a mockup of a webpage related to data validation tasks of an FA workflow using the present technology.

Figure 12:
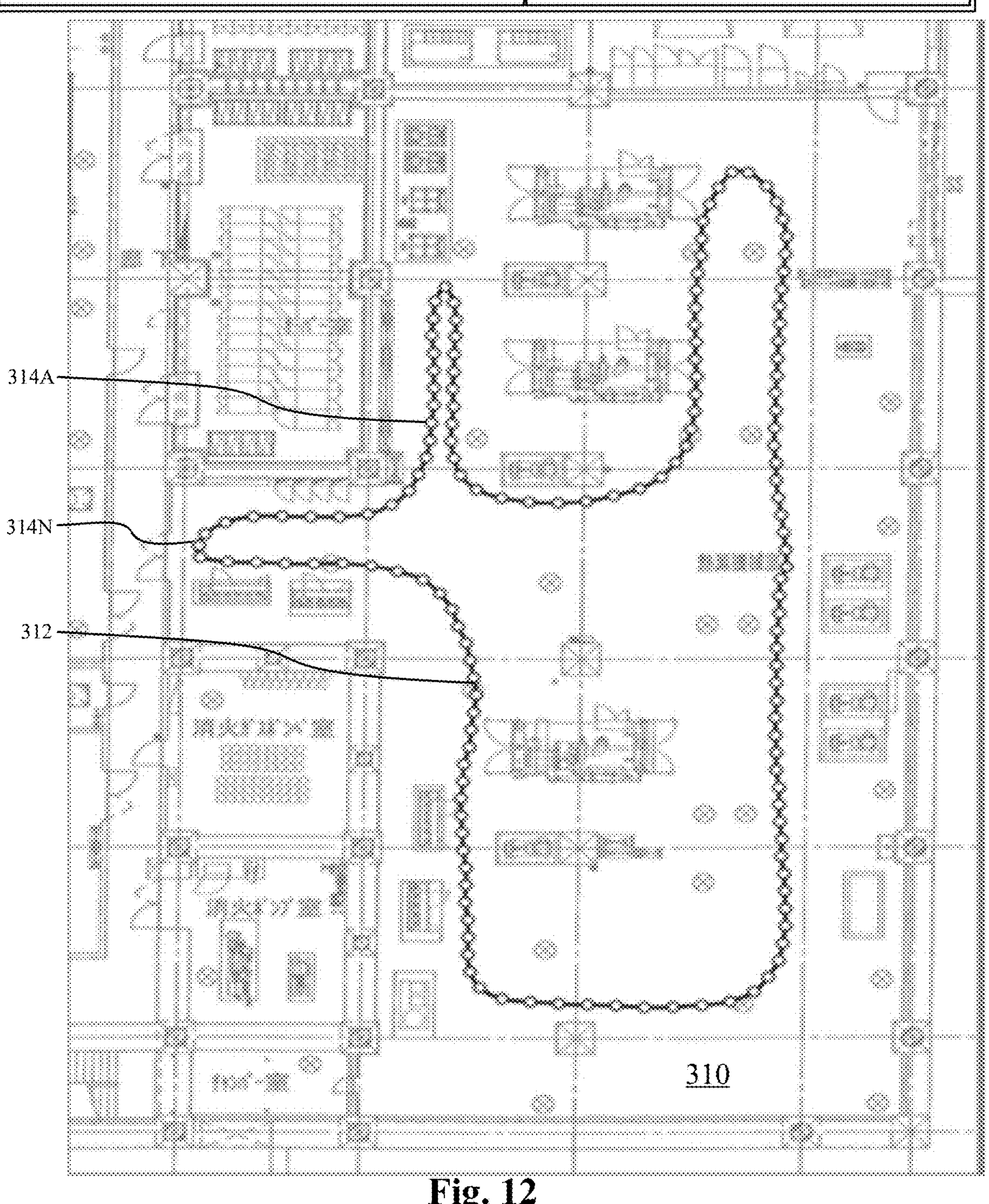
FIG. 12 shows a montage containing a blueprint/floorplan onto which an estimated path of an inspection has been overlaid based on the present teachings.
Figure 13:

FIG. 13 presents an exemplary modal window showing a 360-degree view associated with a particular circle/point on the path of FIG. 12.

Figure 14:
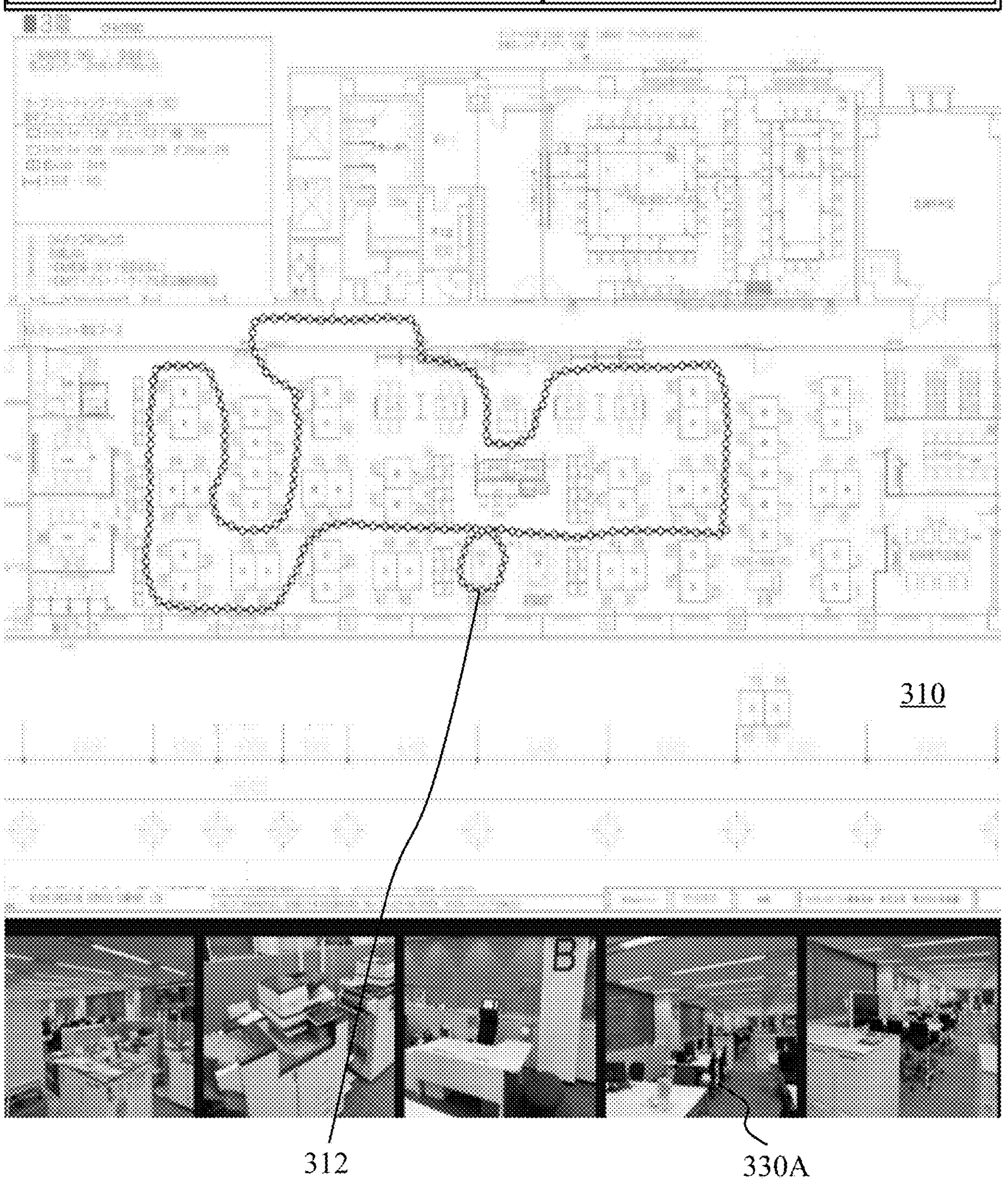

FIG. 14 shows a montage from an embodiment that allows the user to upload secondary photos captured with a supplementary device (e.g., a smartphone) and associate these with an inspection.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Let us now review the systems and methods of montaging based on the present technology. Among other applications, the present montaging technology is well-suited for implementing field automation (FA) for a variety of industries. In such industries, participants benefit from sharing a common representation of a facility, such as a building, a warehouse, a factory or a home/house. Target industries that can benefit from FA based on the present technology include architecture, engineering and construction (AEC), real-estate, manufacturing, warehousing and/or logistics, among many others. Specific areas that may be the beneficiaries in the above target industries include site inspections, factory retooling, facility management, real-estate sales, warehousing, among many others. The reader is informed that the benefits accrued by the present design to AEC embodiments discussed in detail below can be applied, with minor adaptations (if needed), to real-estate and related industries also.

Figure 1:
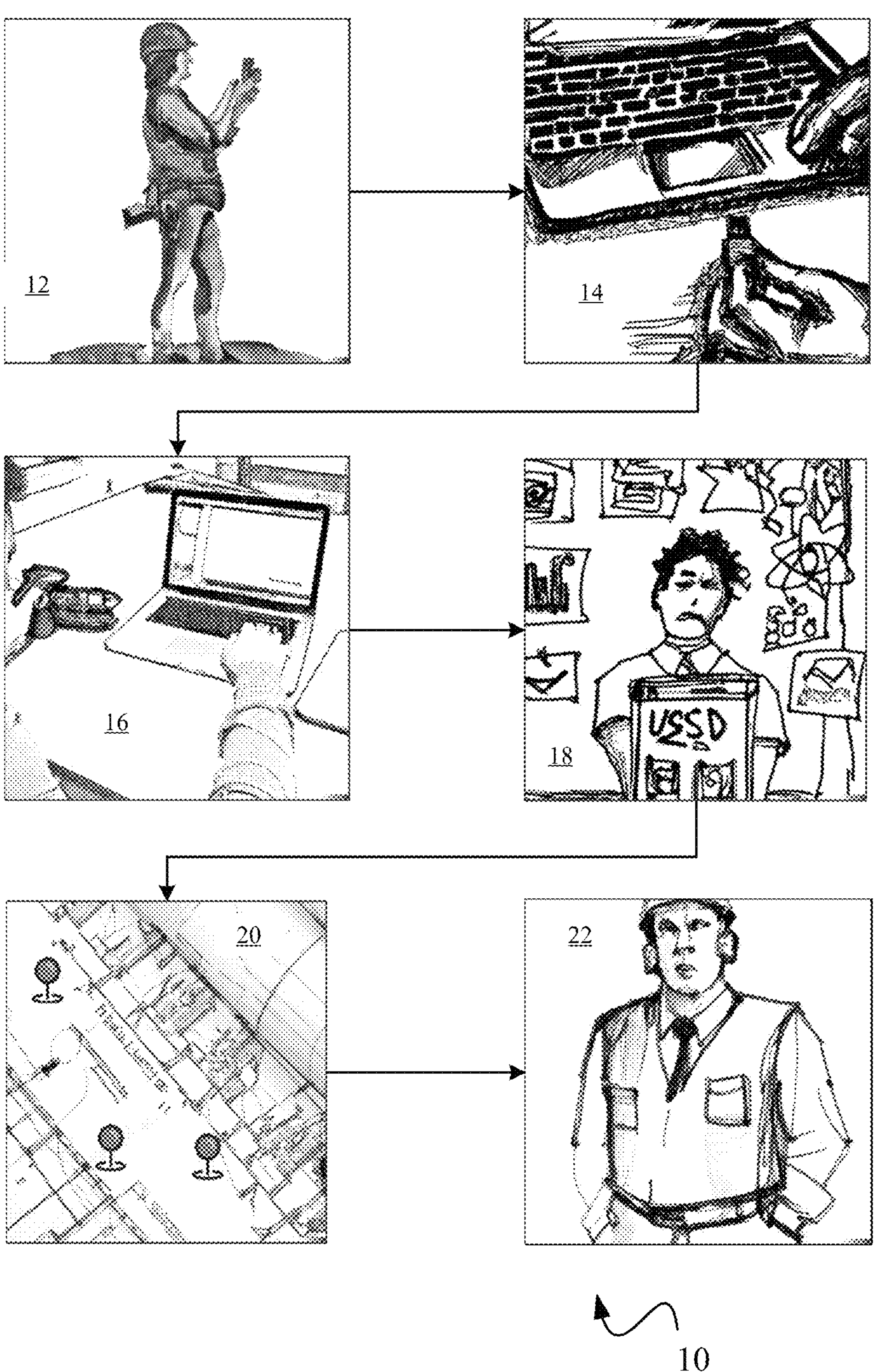
Figure 2:
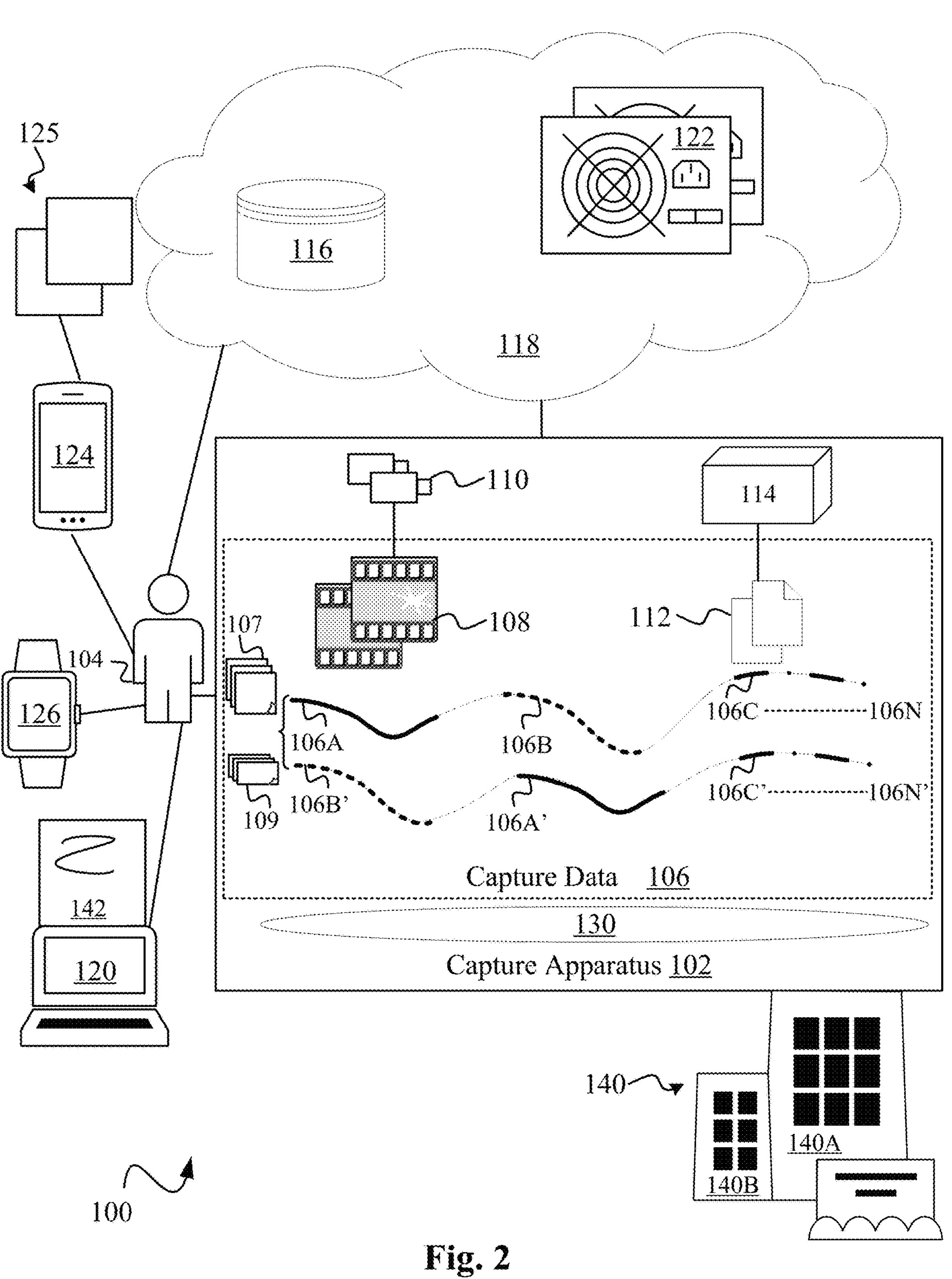

Let us now take advantage of FIG. 2 in conjunction with FIG. 3 and an overall FA workflow. Such an FA workflow 150 can be divided into a number of tasks/functions/activities as provided below:

FA Workflow 150:

(1) Collect and store capture data from a capture session.

(2) Perform data validation.

(3) Estimate a velocity profile and the positions of the capture apparatus during the capture session.

(4) Produce a visual representation suitable for a given application based on the positions of the capture apparatus.

(5) Perform additional reporting and analysis as needed.

In any given FA implementation, these activities may be performed by different users, engaged with different modules of the instant system, however they may also be performed by the same user. Let us now review these activities and functions that are greatly improved by the montaging systems and methods of the present technology in much more detail.

(1) Collect and Store Capture Data from a Capture Session:

A capture session is characterized by a "walkthrough" of a site, building, facility or home or any other physical area of interest by an observer or an operator or a user carrying the capture apparatus. In practice, the walkthrough may be any form of locomotion of the observer, aided or unaided i.e. with or without the observer being on a mechanized ride e.g. a scooter. The observer is likely a human, although the observer may also be a robot. Because a capture session always employs such a walkthrough, we will use the terms capture session and walkthrough interchangeably in this disclosure.

For the purpose of understanding the first stage or set of functions (1) of FA workflow 150 above, let us take a detailed look at FIG. 2 now. FIG. 2 shows an embodiment 100 of a montaging system comprising a capture apparatus 102 carried by an observer or user 104. Capture apparatus collects capture data 106 shown within the dotted-lined box. Capture data 106 comprises of video data 108 recorded or captured by one or more cameras 110 and IMU data 112 measured or taken by an inertial measurement unit (IMU) 114.

Camera(s) 110 and IMU 114 are onboard capture apparatus 102 carried by observer or user or operator 104. Capture data 106 comprises one or more portions 106A, 106B, . . . 106N as shown. Three portions 106A, 106B and 106C are shown and marked explicitly but any number of such portions may be present as shown by the dotted line connecting portions 106C and 106N. According to the chief aspects, portions 106A, 106B, . . . 106N of capture data 106 are unordered. In other words, there is no requirement on the order or ordering of portions 106A-N of capture data 106 as these portions are collected. Stated differently, in this stage (1) of workflow 150, one or more portions 106A, 106B, . . . of capture data 106 are collected and stored in any arbitrary order.

Capture apparatus 102 has enough compute, memory/storage and network capabilities to execute a capture application 130 that is in charge of performing its various functions as will be described herein. Preferably, these resources are available on capture apparatus 102 itself in the form of an embedded computer. These compute, storage and network resources on capture apparatus 102 are not explicitly shown in FIG. 2 to avoid clutter. As capture data 106 in portions 106A-N is collected, it is first stored by capture application 130 locally on capture apparatus 102 in its local memory storage.

However, from time to time, capture data 106 is uploaded to a remote computer storage 116. Remote storage 116 is preferably in the cloud, such as cloud 118 shown in FIG. 2. However, remote storage 116 may be any remote storage with substantially more storage capacity than the local storage on capture apparatus 102. The uploading of capture data 106 is performed by capture application 130 running on apparatus 102. This uploading of capture data requires that there is network connectivity between capture apparatus 102 and remote storage 116.

The present technology recognizes that such network connectivity can be disrupted at times. That is why capture data 106 is stored locally per above or "buffered" on the capture apparatus. It is then copied to remote storage 116 when there is network connectivity and according to a data replication scheme. In other words, local storage on apparatus 102 acts as a local buffer for locally storing capture data 106 until the time that there is network connectivity to remote storage 116 for uploading data 106 or until a prescribed time or event. As will be explained further below, based on the markings applied by user 104 on capture data 106, and specifically to (unordered) portions 106A-N, these portions may be wholly or selectively designated by user 104 to be discarded from capture apparatus 102 without having to be uploaded to remote storage 116.

According to the instant design of montaging system 100 of FIG. 2, user 104 applies one or more markings 107 to portions 106A-N. Depending on the embodiment, markings 107 may be applied by the user in a number of ways and may serve a variety of purposes. In one set of embodiments, markings 107 contain waypoints or waypoint information entered by the user. For this purpose, appropriate user interface (UI) affordances are provided to user 104 in montaging system 100. A waypoint signifies any important point or location during the walkthrough performed by user 104 and such markings are also referred to as waypoint markings.

In one such embodiment, the waypoint marks the start and end of the walkthrough or capture session in capture data 106. In an AEC project, such a capture session is referred to as an inspection, and user 104 is referred to as an inspector. So, the waypoint information entered by the user in such AEC embodiments identifies the position in capture data 106 where the inspection started and ended. This may be accomplished by the user entering a specific time instant in video data 110 or IMU data 114 that identifies the start and end of the inspection. More particularly, user 104 identifies one of portions 106A-N and a time instant in it when the inspection started. In a similar manner, user 104 identifies one of portions 106A-N and a time instant in it when the inspection ended. Usual sanity checks, e.g. inspection end time cannot be the same or before the inspection start time, and the like, are applied.

Depending on the embodiment, a waypoint and more specifically a waypoint marking may thus be entered in system 100 of FIG. 2 as a combination of the identifier of a specific portion from portions 106A-N and a time instant within the identified portion. Alternatively, a waypoint marking may also be entered as geographical coordinates or reference points or locations of interest in the walkthrough performed by observer 104.

An inspection is a critical part of an AEC project. It is performed by a qualified person/personnel or observer/user 104 at a given project or building or site 140, which may be a construction site. More specifically, it is performed at a page or a folio or a section of such a site/project/building. Building 140 in FIG. 2 has two such sections 140A and 140B as shown. In this disclosure, we use the terms folio, page and section interchangeably as well as the terms site and project. For simple sites/projects, there may only be one section or folio at a site. In such a scenario, the terms site, project and section may be used interchangeably.

Regardless, an inspection is a specific use-case of capture session for an AEC or another application that requires an inspection or a survey or an examination of a site. Thus, in embodiments in which an inspection is carried out during the capture session, the terms capture session, walkthrough and inspection may be employed interchangeably.

More specifically, an inspection is a period of time during which user 104 inspects a section of a project and collects and stores capture data 106 via apparatus 102. There may be more than one inspection performed for a given folio/page/section of a site/project. For brevity we refer to capture apparatus 102 as "producing" capture data 106 with the understanding that it is camera(s) 110 and IMU 114 onboard capture apparatus 102 that produce video data/content 108 and IMU data 112 respectively.

Capture data 106 thus produced is also collected or recorded or "captured" by capture apparatus 102. What we mean is that capture data 106 produced by camera(s) 108 and IMU 112 is collected or stored by appropriate memory/storage devices onboard capture apparatus 102. Local memory storage on capture apparatus 102 is not explicitly shown in FIG. 2 to avoid clutter but is presumed to exist. Capture data 106 is first stored locally in this local storage and then uploaded/transferred to remote storage 116 according to a data replication scheme. In the simplest case, the replication scheme may simply be a periodic upload.

In embodiments where capture apparatus 102 operates as an on-off device (OOD), observer/user 104 applies markings 107 to portions 106A-N of capture data 106 in real-time or simultaneously or concurrently while the capture session is active. These markings preferably designate the start and end of the capture session. For an AEC application, this is while the inspection is being performed. In such an OOD scenario, user 104 starts or turns on capture apparatus 102 and specifically instructs capture application 130 to do so at the start of the capture session/inspection. This signifies the start of the capture session. Then the user turns off capture apparatus 102 and more specifically instructs capture application 130 to do so at the end of the capture session/inspection. This signifies the end of the capture session.

However, in alternative embodiments where capture apparatus operates as an always-on device (AOD), capture data 106 is continuously collected or captured. In such AOD embodiments, observer/user 104 applies markings to portions 106A-N of capture data 106 retrospectively i.e. after the fact or after the data has been collected/recorded/captured and stored or ex post facto. In one such embodiment, user 104 does this by entering one or more waypoints to/into capture data 106, or in other words, by applying waypoint markings to portions 106A-N. Such waypoint markings preferably identify the start and end of the inspection or capture session per above.

The walkthrough of user 106 during a capture session is usually not a single continuous motion without pauses or stops. Thus, user 104 also advantageously applies markings 107 to portions 106A-N to indicate such pauses. Each such marking is a waypoint that represents a momentary and brief pause during the walkthrough. For an inspection, it usually lasts only a few seconds although it can be longer. A user may perform a pause or stop for one or more of several reasons. For example, to mark a point of interest or an easily recognizable location, or when a required checkpoint location is reached, or at the intended start and end of the walkthrough/inspection. Exemplarily, such a checkpoint may be an entrance and/or an exit of the building/site.

Referring to the above discussion of OOD versus AOD configurations of capture apparatus 102, a waypoint marking 107 that signifies a pause/stop in the walkthrough may be applied or entered into capture data 106 as it is collected or afterwards. In a preferred embodiment in which user 106 wears a head-worn capture apparatus 102, a marking 107 may be applied to capture data 106 simply by a head gesture and concurrently with the capture session. In other words, the head gesture automatically enters a waypoint of interest into capture data 106 and more specifically in one of portions 106A-N being captured/collected/recorded. If capture apparatus 102 is an AOD device, then the present technology allows the markings to be applied retrospectively into capture data 106 after it has been produced and collected per above explanation.

A key innovation of the present design is the ability to perform walkthroughs at a given site/project non-sequentially or out of order or in any arbitrary order or at will or not in a preordained path/route or not following a prescribed schedule. After capture data 106 from a given capture session has been produced and collected, UI affordances in system 100 are invoked that allow the user to order its portions 106A-N. Based on the requirements of a given application, a practitioner is able to order portions 106A-N as required to produced/generate a montage or visual composition 142 for the given application. Explained further, the results produced by montaging system 100 of the present design comprise montage 142 and they may be used for reporting or analysis as needed. In addition, they may include any other data of interest accumulated from the capture apparatus and from subsequent processing.

In the case of an AEC application, the preferred visual composition or montage of interest 142 generated by montaging system 100 is a path that the inspector took during the inspection. More specifically, montaging system 100 first determines or estimates the velocity profile of capture apparatus 102 during the walkthrough by deploying instant visual inertial odometry (VIO). It then determines or estimates a set of positions of the capture apparatus from the velocity profile based on the constraints conditioning the motion of capture apparatus 102 as to be discussed further below. This set of positions trace or constitute a path of the capture apparatus as carried by inspector 104 during the inspection. Therefore, it is important to order portions 106A-N first before such a path is traced or determined or estimated.

This is so that the set of positions estimated from the ordered portions 106A-N would trace a path that covers or circumscribes all the sections of the building that are to be inspected. For example, it may be desirable for a prescribed path to cover the entryway first, then the hallway, then the offices, then the storage and the mailroom and so on. The present technology allows the above to be accomplished, even though the inspector may not have physically followed the prescribed path. In other words, the present design does not impose the prescribed path on the physical walkthrough or inspection, while still arriving at the prescribed path. It does so by enabling user 104 to order portions 106A-N before performing path estimation.

While still taking advantage of FIG. 2, let us now consider an AEC example where capture data 106 was collected as three (unordered) portions 106A-C in this arbitrary order or sequence "in time": 106A, 106B and 106C. Let us assume that site/building 140 consists of three folios or sections i.e. first, intermediate, last. Only two such folios 140A and 140B are explicitly marked and shown in FIG. 2 for clarity. Further, our observer or inspector 104 walks through the intermediate section first, causing unordered portion 106A of capture data 106 to be collected.

Then, the observer/inspector passes through the first section of the building, causing unordered portion 106B to be collected. Finally, the observer/inspector passes through the third and the final section of the building and this causes unordered portion 106C to be collected. Now, by utilizing UI affordances of montaging system 100 and based on markings 107 applied to the unordered portions 106A-C, user 104 orders or sorts these unordered portions such that they are ordered according to a prescribed path that is suitable for montage or presentation 142 of capture data 106. The sorted order or simply order of unordered portions 106A-C is shown in FIG. 2 as: 106B', 106A' and 106C'. This is the order that is used for tracing or estimating the path of inspector 104 as will be taught further below.

To expound further, user 104 first applies markings 107 to identify each portion 106A, 106B, 106C, for example, by labels/texts "intermediate section", "first section", "third section" respectively. The user then orders the portions based on these markings by designating unordered portion 106B to appear first (as ordered portion 106B'), followed by portion 106A (as ordered portion 106A'), followed by portion 106C (as ordered portion 106C'). Exemplary UI affordances that may be utilized for this purpose include point-and-click and drag-and-drop widgets.

The present technology is thus able to order unordered portions from the order that they were captured "in time" i.e. 106A, 106B and 106C to arrive at an order that is organized "in space" i.e. 106B', 106A', 106C'. The user may apply any ordering on (unordered) portions 106A-C as desired to satisfy the requirements of montage or presentation 142 of capture data 106. For example, one such presentation may require that user orders data portions 106A-C in reverse order of capture i.e., 106C', 106B' and 106A'. The user may also consider after the walkthrough that a certain portion e.g. portion 106C is not relevant or important enough. In that case, the user would exclude or skip the portion from the final order i.e. 106B', 106A'.

The present design considers such user-applied or simply user markings 107 as natural or ordinary elements of a capture session or walkthrough. According to present teachings, these markings annotate or denote or apply additional information to portions 106A-N in a number of useful ways. As noted in the example above, they are also used by system 100 of FIG. 2 in the generation of montage 142 of capture data 106 that is suitable for the application at hand. For AEC embodiments, such a montage 142 comprises the traced/estimated path fit or focalized to the blueprint of the section/folio that has undergone inspection. This montage serves as a "visual evidence" of capture data 106 and is contained in the overall results produced by montaging system 100 per above.

In still related embodiments, user-applied markings 107 are used to identify which of the portions of capture data 106 to include or to exclude from uploading to remote storage 116. More specifically, user 106 may mark portions 106A and 106C to be uploaded to remote storage 116 and to be included for downstream processing for inclusion in montage 142. The user may mark portion 106B to be skipped or excluded from uploading. Alternatively or in addition, the user may mark portion 106B to be skipped or excluded from downstream processing and hence to be excluded from montage 142. Portion 106B may thusly be skipped for a number of reasons, exemplarily for saving computational resources and/or for privacy concerns.

Thus, fragments or portions 106A-N of captured data 106 can be recorded or processed in arbitrary order. Further, the capture apparatus may be off during some portions of the walkthrough and consequently no corresponding portions of capture data may be collected/recorded. Such time periods without recorded capture data can also be the result of camera overexposure (excessive brightness) or underexposure (excessive darkness) or other equipment failures. Moreover, some portions may be marked to be skipped per above i.e. not uploaded and/or excluded from downstream data processing and inclusion in montage 142. In one embodiment, portions 106A-N are uploaded to the cloud for processing. Alternatively, they are processed locally on-premise.

Based on the instant principles, there are also constraints 109 that condition the motion of capture apparatus 102 as hinted above. Let us now discuss this aspect of the present design in a lot more detail. In order for the present technology to accurately determine the positions of the capture apparatus during the walkthrough, it is important that one or more constraints 109 be applied that condition the motion that capture apparatus 102 of FIG. 2 undergoes. These constraints 109 are applied during the mathematical computations performed for the estimation of positions of capture apparatus 102 during its motion.

Constraints 109 conditioning the motion of the capture apparatus 102 are derived from a number of sources and can be applied in a number of ways. These constraints are in part derived from user markings 107 applied to portions 106A-N of capture data 106. In the preferred embodiments, some subset of constraints 109 are derived from waypoint markings 107 applied by the user to data portions. In the same or related embodiments, these constraints 109 take the form of manual corrections applied by the user to the set of positions of the captured apparatus determined by montaging system 100.

In AEC embodiments, such corrections are applied to the walkthrough path, or simply path, of capture apparatus 102 traced/estimated. For this purpose, an appropriate graphical user interface (GUI) is provided for the user to manually use correction points or to "drag" the path or line on the blueprint as desired. This is also referred to as editing or confirmation of the path in the present design.

In other embodiments, applied constraints 109 conditioning the motion of capture apparatus 102 comprise a reference point that is derived from an optical fiducial marker or a visual landmark or a reference point or a checkpoint or a visual identifier at the site. What this means is that a marker or landmark at the site is first recognized by the system using computer vision techniques. Then, its location at the site is used as a reference point and applied as a constraint 109 conditioning the motion of capture apparatus 102 for correcting/adjusting the estimated set of positions of the capture apparatus.

Therefore, rather than manually entering/inputting corrections to the computed/determined/estimated positions of the capture apparatus, they are automatically applied/entered from known reference points. Those reference points are in turn derived from visual markers/landmarks/identifiers at the building/site, and are then applied as constraints for estimating the positions of the capture apparatus per above. In still other embodiments, applied constraints 109 are automatically derived from pauses or stops detected in the motion of capture apparatus 102. Recall, that such pauses/stops may also be explicitly entered by user 104 as waypoint markings 107 and applied constraints 109 may also be based on such waypoint markings.

In a preferred embodiment, montage 142 is generated/produced on computing device 120 that is separate from capture apparatus 102. This is because visualization and reporting may require storage and compute resources that are excessive for storage and compute resources onboard capture apparatus 102. In the case of AEC embodiments for example, the estimated path is algorithmically fit to a blueprint of a section e.g. section 140A or section 140B of site 140. The above path fitting or overlaying is preferably performed by/on computing device 120. Computing device 120 may also store the blueprints for site 140.

The present technology thus greatly simplifies field automation (FA) by allowing an observer/operator 104 to freely perform walkthroughs in any order at a site/building 140. These walkthroughs or walkthrough portions may be performed as convenient by observer 104 and produce corresponding unordered capture data portions 106A-N. The present technology is then still able to order these portions 106A-N and produce a montage 142 of capture data 106 that is suitable for a given application. Capture data 106 includes video data 108 from one or more cameras 110 on capture apparatus 102 as well as IMU data 112 from IMU 114 onboard capture apparatus 102. Preferably, montage 142 allows the user to access the video footage in video data 108 as well as IMU data 112 at various points during the walkthrough as desired.

Capture apparatus 102 of FIG. 2 is operated by user/operator/inspector 104 per above. The operation of the apparatus includes turning the apparatus on or off, calibrating camera 110 and/or the IMU sensors 114, checking the overall status of the apparatus among other tasks. Therefore, there is an appropriate human-computer interface provided with capture apparatus 102. Such a human-computer interface may include a touchscreen with an appropriate user interface (UI), or a keyboard and a screen presenting a UI, among other options available in the art. However, in the preferred embodiment, capture apparatus 102 is head-mounted on user/inspector 104 thus allowing for its hands-free operation. Alternatively, the capture apparatus is mounted on a monopod or a "stick" carried by observer/user 104.

The present design also offers a companion device 126 carried by user 104. The companion device enables the user to conveniently issue commands to capture apparatus 102 without having to inconveniently access the apparatus such as by dismounting the helmet. The companion device runs a companion application and has its own UI such as a touchscreen or a screen/keyboard for the user. A companion device is also needed in embodiments where capture apparatus 102 does not have its own UI and thus necessarily has to rely on the companion device for inputting commands and displaying results back to the user. Examples of a companion device include a smartwatch such as smartwatch 126 shown in FIG. 2, a smartphone, a tablet or any other mobile computing device that can be conveniently carried by user 104.

In some embodiments, capture application 130 running on capture apparatus 102 also allows user or operator or inspector 104 to include secondary content 125 such as pictures, notes and/or voice memos taken on/from secondary device

124. Secondary content 125 is thus included in capture data 106. Secondary or supplemental device 124 may be a mobile computing device such as a smartwatch, smartphone, tablet or the like that has a camera/microphone and is easily carried/transported by user 104.

Depending on the embodiment, secondary or supplemental device 124 and companion device 126 may be a single device that is able to take and upload pictures/notes/memos 125 as well as to run the companion application. Secondary content 125 is then utilized by/in montage 142 as needed for a given application. For example, by clicking at a given point or position on the montage, the user is able to access video data 108 and IMU data 112 from the clicked point. Additionally, the user is also able to access secondary content 125 from the clicked point and in turn the corresponding point/location in the walkthrough. If such secondary content is not available from the clicked point, then the available secondary content from or a point close/closest to the clicked point is retrieved for user 104.

In the case of AEC embodiments, by utilizing an appropriate UI on computing device 120 or secondary device 124 or on companion device 126 (if present) or on capture apparatus 120 itself, user/operator 104 can assign an inspection or capture session to a building/project/site, such as building 140, and specifically to a section/folio of it, such as section 140B. In this manner, any number of inspections may be assigned to a given section of a building. Alternatively, or in addition, the UI allows the user to preassign a capture apparatus, such as apparatus 102 of FIG. 2 or its camera(s) 110 and/or its IMU 114 to a project e.g. project 140.

From then on, any capture data captured by apparatus 102, such as capture data 106 of FIG. 2 is automatically assigned to site/project 140. This also means that any pictures 125 taken by secondary device 124 of montaging system 100 that are contained in capture data 106 are also automatically assigned to that project. Subsequently, the user can also reassign the inspections and any secondary pictures to an individual section, such as section 140B of project 140. Alternatively, or in addition, user 104 can also preassign apparatus 102 and/or cameras 110 and/or IMU 114 to an individual section 140B of project 140.

Depending on the embodiment, one or more of cameras 110 are 360-degrees cameras. Exemplarily, such a camera is one of Theta series cameras manufactured by The Ricoh Company, Limited. Alternatively, camera 110 is an Insta360 series camera manufactured by Arashi Vision Inc. As will be explained further below, having a 360-degrees camera or cameras and/or having omnidirectionality of video footage is not a requirement of the present design.

Figure 3A:
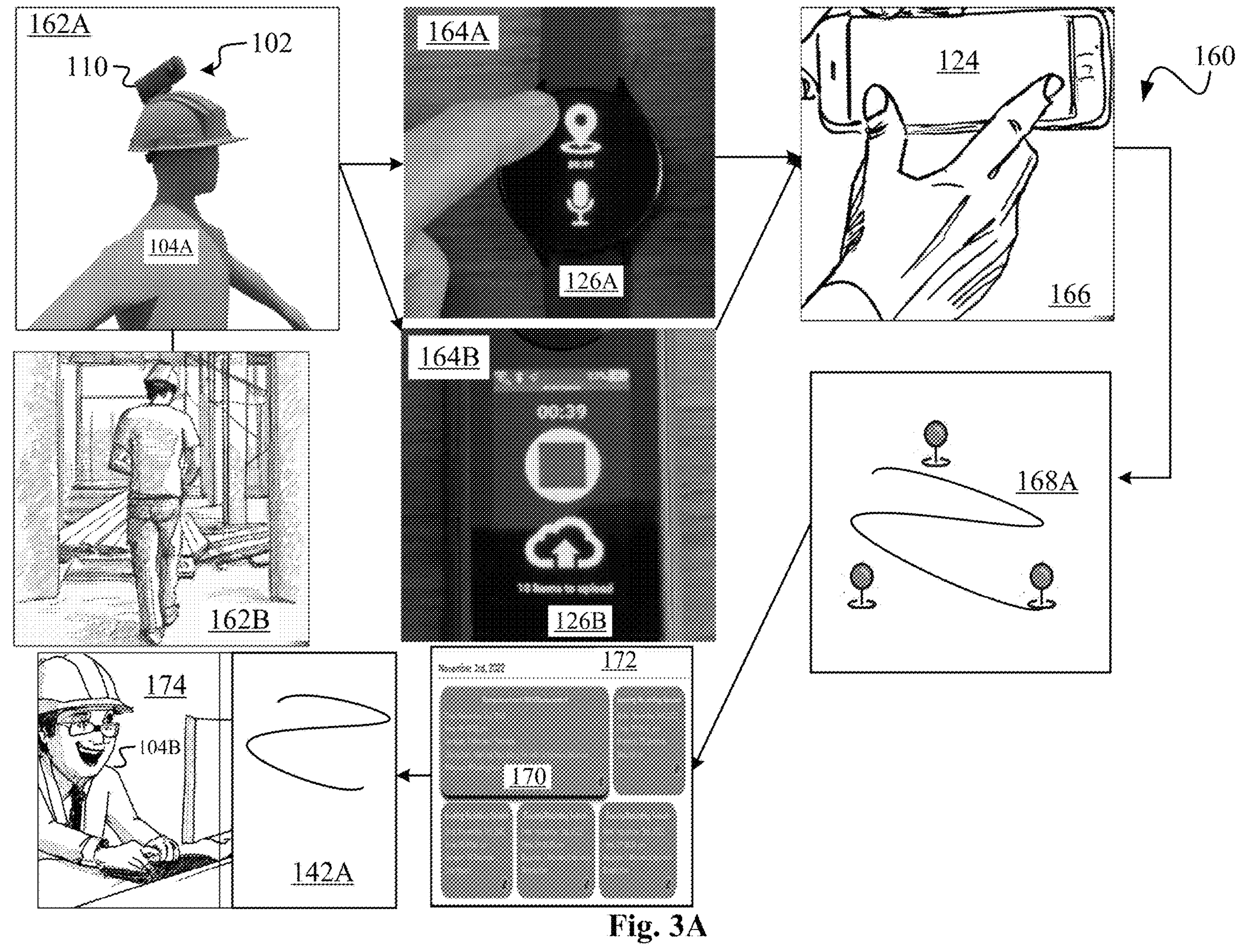
FIG. 3A illustrates a field automation (FA) workflow based on the present principles.
Figure 3B:
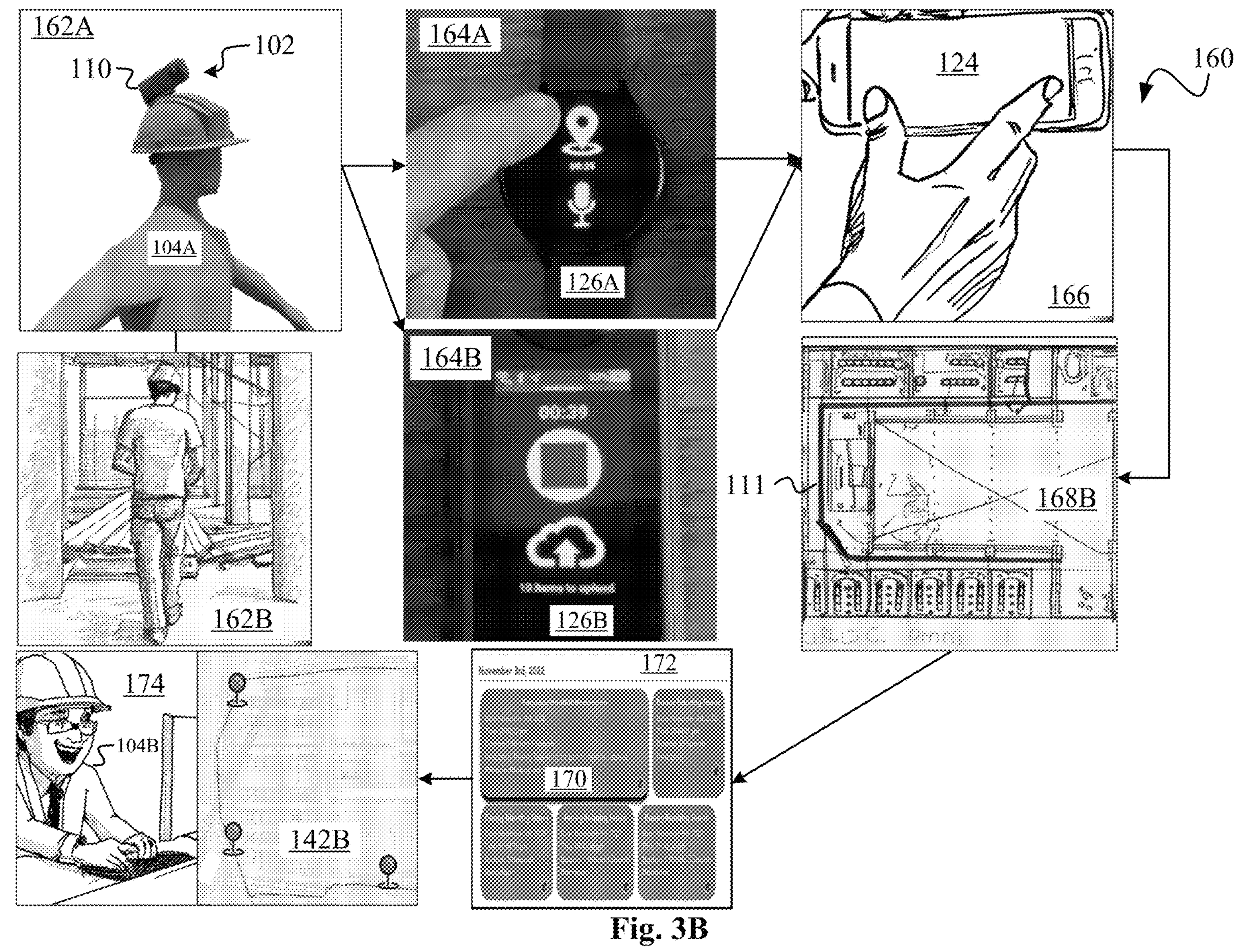
FIG. 3B is a variation of FIG. 3A as applied to AEC embodiments.

FIG. 3A shows a workflow 160 based on the present principles that is realized by deploying montaging system 100 of FIG. 2. FIG. 3B is a variation of FIG. 3A as applied to AEC embodiments. More specifically, in step/block 162A, an exemplary observer/user 104A is shown wearing a helmet embedded with capture apparatus 102 of the above teachings. Not all the components of capture apparatus 102 are visible in block 162A, however a camera 110 is explicitly shown. Depending on the embodiment, camera 110 may be a 360-degree camera. Associated step/block 162B of workflow 160 shows user 104A performing a physical walkthrough at a given site or project. For AEC embodiments, user 104A is an inspector and the walkthrough of block 162B is a site/project inspection.

While performing the walkthrough, user 104A is able to access or instruct capture apparatus 102 via a companion device, exemplarily a smartwatch 126A as shown in step/block 164A. Block step 164B shows an alternate handheld companion device 126B. Step/block 166 shows a smartphone as a secondary or supplementary device 124 of FIG. 2 carried by user 104A that may be used to capture secondary pictures, notes and/or voice memos in capture data 106 of the inspection per above teachings.

Then instant montaging system 100 estimates the velocity profile of capture apparatus 102 by deploying non-sequential VIO based on markings 107 as taught further below. It then computes a set of positions of the capture apparatus during the walkthrough based on the velocity profile and constraints 109 conditioning the motion of the capture apparatus per above. Then as shown by block 168A of FIG. 3A, montaging system 100 produces a montage 142A that is suitable for the given application of montaging system 100. This montage 142A is produced and made available via computer application 170 in step/block 170 to user 104B in step/block 174.

As shown in FIG. 3B as a variation of FIG. 3A for AEC, the montage is an estimated path of the inspector that is fit to a blueprint or floorplan of the section of the building being inspected. The system allows the user to manually perform any requisite corrections to the fit per above. These activities of path estimation, fitting of the path to a blueprint and manual corrections are shown by step or bock 168B of FIG. 3B. Step/block 168B visualizes estimated path 111 fit and overlaid onto an underlying blueprint as shown.

Next, as in FIG. 3A, step/block 172 of FIG. 3B shows the GUI of an exemplary computer application 170 of the present design preferably running on computing device 120 shown and discussed in reference to FIG. 2. By utilizing computer application 170, user 104B can perform data validation as well as access montage 142B produced by the system. Visual composition/representation/presentation/montage 142B is suitable for the given AEC application that is enjoying FA benefits from montaging system 100 of FIG. 2. Moreover, user 104B can also perform reporting/querying of/on the results via application 170 as needed.

As will be discussed further below, data validation ensures that all requisite data related to the walkthrough(s) is present in the system. For AEC embodiments, data validation includes assigning or reassigning various inspections to the various sections of the building. Reporting/querying of the results includes querying the system for capture data associated with any point of interest on the estimated path along with video footage or secondary pictures associated with that point, and/or performing any other analyses on the data. Such analyses include querying for capture data 106 or content by location of a section or by an address of a site or by a given waypoint entered by the user among others. Step/block 174 shows user 104B e.g. a supervisor or a foreman performing the above data validation and/or analyses/querying of the system. In FIG. 3A-B, user/supervisor 104B is different from user/inspector 104A, although the two may also be the same user.

In fact, the present design allows for multiple users or observers who may team up collaboratively to perform a walkthrough or inspection. This is especially important for very large commercial sites and projects where it is impractical for a single observer/inspector to perform all the requisite inspections. In such multi-observer or multi-inspector embodiments, all the relevant present teachings apply except that observer/user 104 of FIG. 2 is embodied by multiple users who collectively perform their actions as described.

In such a multi-observer scenario, each observer may carry an instant capture apparatus or one or more capture apparatus may be shared by more than one observer. Thus, one such observer/inspector may perform a walkthrough of one section of the building while another performs a walkthrough of another section and so on. They may then apply markings 107 on data portions corresponding to their walkthroughs per above. Alternatively, the task of applying markings 107 may be shared amongst a subset of the observers. In one variation, the paths taken by each observer are combined and collectively fit to a blueprint of the site for producing montage 142. In an alternative variation, the paths taken by each observer are not combined but individually fit to corresponding portions of the blueprint to produce montage 142.

Figure 4:
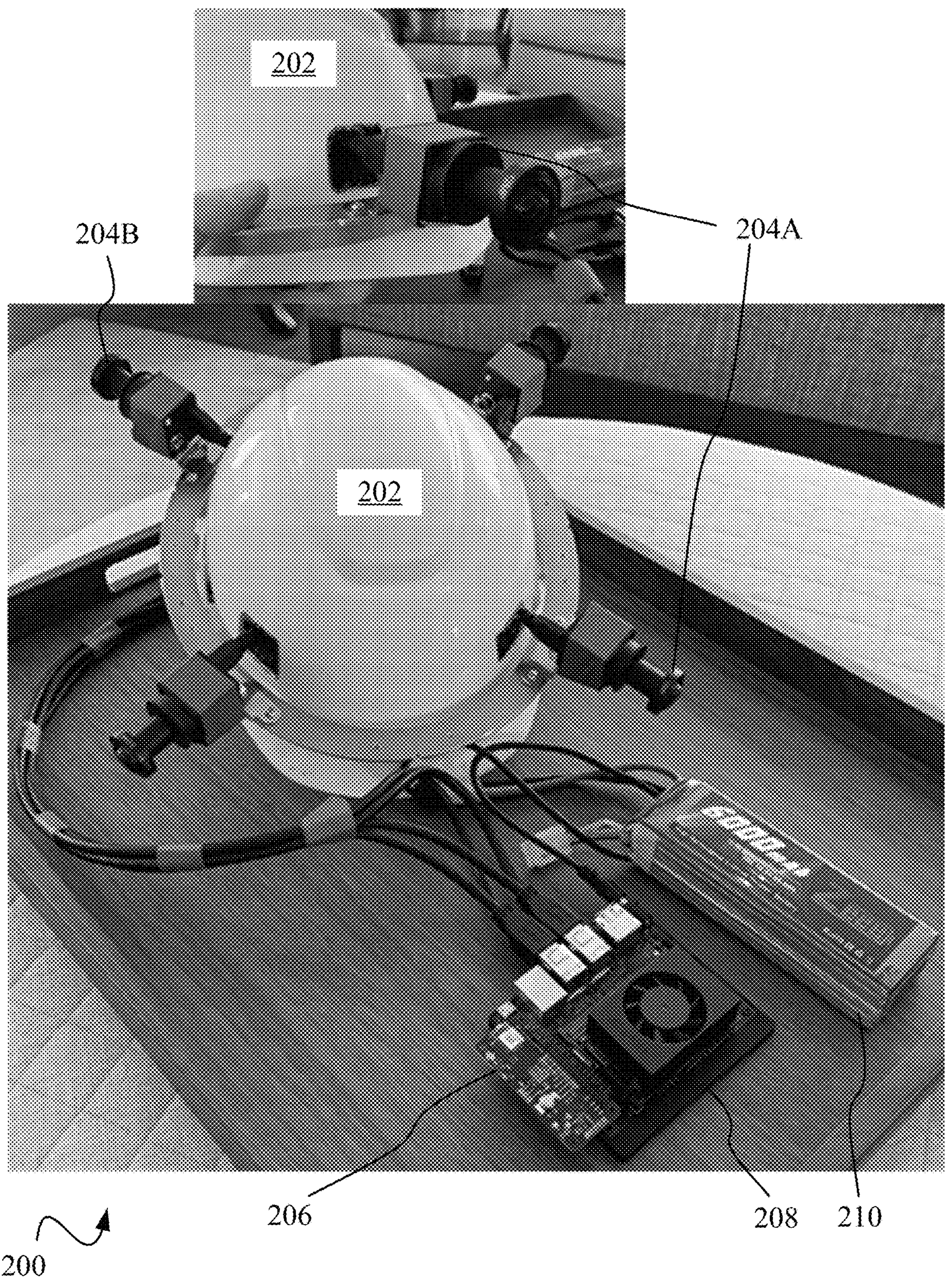
FIG. 4 shows two views of an exemplary capture apparatus of a preferred embodiment.

FIG. 4 shows two views of another exemplary capture apparatus of a preferred embodiment based on the instant principles. Capture apparatus 200 shown in FIG. 4 consists of a helmet 202 to which four cameras 204 are attached as shown. The set or array of cameras 104 afford obtaining a complete or partial 360-degree video footage for inclusion in the capture data captured or gathered or collected by capture apparatus 200. Of course, any number of such cameras may be present. Only two of these cameras are marked by reference numerals 204A and 204B to avoid clutter.

In one embodiment, cameras 204 are off-the-shelf cameras, exemplarily, FLIR Blackfly cameras operating in 8-bit monochrome mode with 2000×1500 pixels resolution at 30 frames per second (fps). In the embodiment shown in FIG. 4 these cameras are non-360-degrees (unidirectional) or standard or regular cameras. Omnidirectionality in such an embodiment is achieved through the use of this array of non-360-degrees cameras 204 and not just a single camera. As discussed herein, however, omnidirectionality is not a requirement of the present design. As a consequence of its non-sequential VIO taught further below, the present technology also allows for video framerate to be different across the cameras.

Capture apparatus 200 also shows an IMU 206. Exemplarily, IMU 206 is a BerryGPS-IMU version 3. Cameras 204 and IMU 206 are operably connected to an onboard computer 208 powered by a battery 210 as shown. Exemplarily, computer 208 is an NVIDIA Jetson Nano embedded computer and the battery is a 600 mAh battery pack. Capture apparatus 200 is carried by a user during inspections for facilitating field automation (FA) per present teachings.

Figure 5:
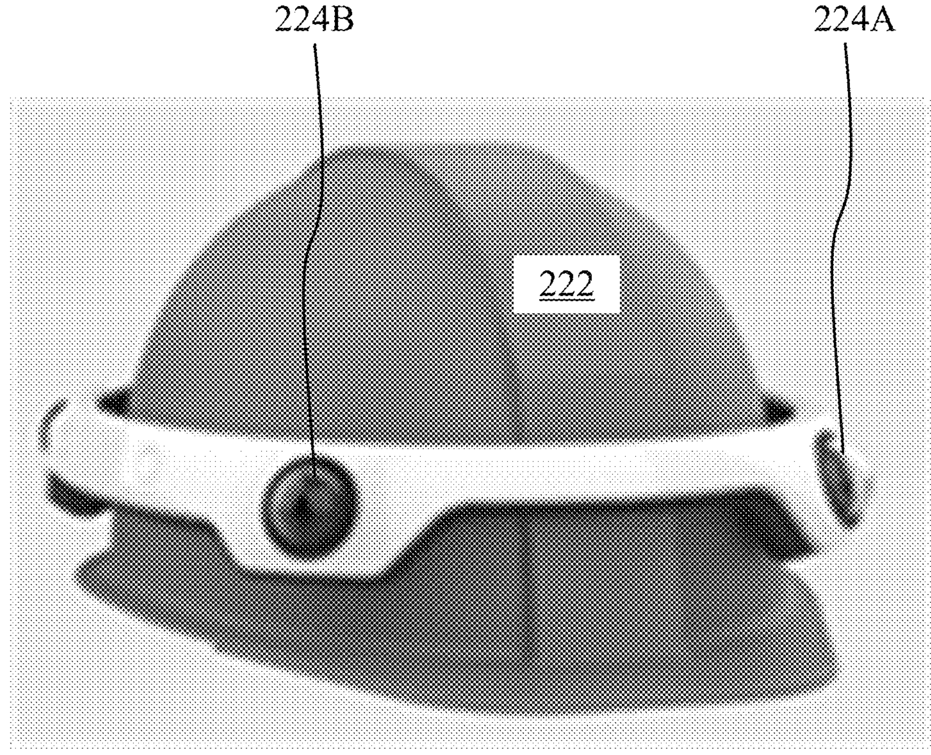
FIG. 5 shows another configuration of a capture apparatus in an alternative embodiment.

A variety of configurations of capture apparatus based on the present principles are conceivable. These include having a single omnidirectional or 360-degrees view camera on the helmet. These also include having one or more regular or non-360-degrees view cameras on the helmet. This is because having a 360-degree view is not a requirement in order to estimate positions of the capture apparatus during a walkthrough based on non-sequential VIO of the present design. FIG. 5 shows another configuration of a capture apparatus 220. Apparatus 220 utilizes a helmet 222 that has 4 ultrawide-angle cameras 224 mounted to it as shown. Only two of those cameras 224A and 224B are visible and marked by reference numerals in FIG. 5 for clarity.

The preferred embodiments of the present technology utilize 360-degrees or 360-degree imagery, however that is not a requirement as already stated. Depending on the embodiment, the 360-degree imagery can be accomplished using a variety of hardware solutions within the scope of the present design. In one such embodiment, the inspector wears a helmet with a head-mounted 360-camera presently available in the market. In another embodiment, the user carries the 360-camera using a monopod. Even though using a 360-degree camera is not a requirement, there is an advantage in using an omnidirectional capture device. This is because often it is not known beforehand which areas of the environment are noteworthy or important. It is therefore advantageous to capture visual information from all directions simultaneously during the walkthrough.

Figure 6:
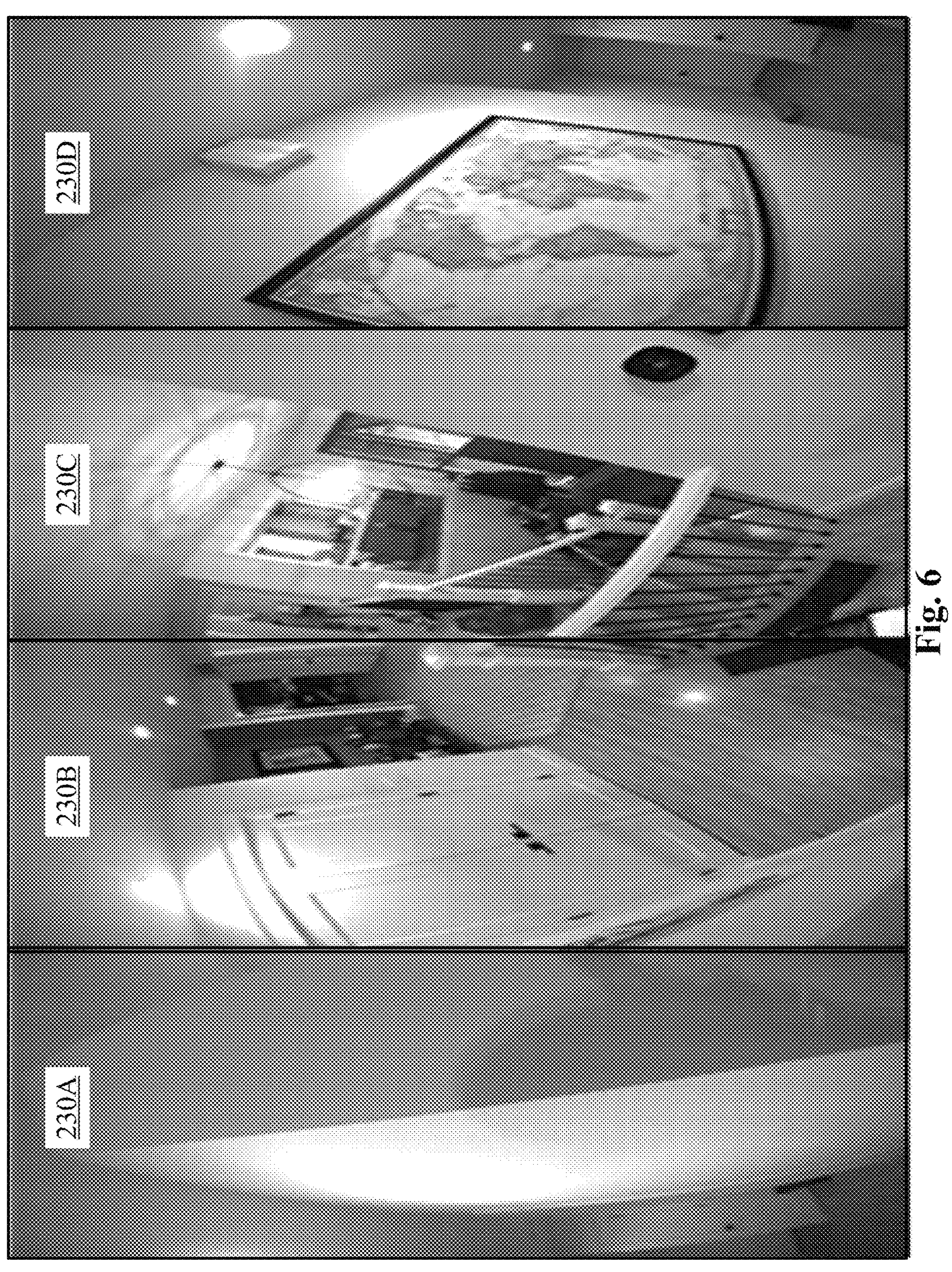
FIG. 6 shows four scenes from a video footage/coverage using a multi-camera capture apparatus.

FIG. 6 shows scenes 230A, 230B, 230C and 230D from a video footage using one of the above multi-camera capture apparatus 200 or 220. It is immediately obvious that it is not a full omnidirectional coverage. This is because perfect or full omnidirectionality or 360-degrees/degree view or spherical view is not required by the present technology to accrue its many benefits. Embodiments have been implemented using two or more independent capture devices of limited field of view jointly achieving partial omnidirectionality. Furthermore, the present technology can perform its functions even when gaps in coverage exist. This is because the instant non-sequential VIO is able to process video and inertial/IMU data and is able to combine or "stitch together" unordered or non-sequential video sequences contained in video data and (consequently in capture data).

Referring back to FIGS. 2-3, it is to be noted that capture data 106 captured by capture apparatus 102 comprising camera(s) 110 and IMU 114 is necessarily organized "in time". Specifically referring to video data 108, camera(s) 110 capture video or image sequences that are a representation of reality as it occurred during the time that the camera(s) were operating. These video sequences may be captured in any order by a user such as observer 104. From the raw footage in capture data 106, it is not possible to know if a video scene contains a given part of a building or not.

However, based on markings 107 applied by observer 104 on portions 106A-N of capture data 106 and the ordering performed based on the markings as taught above, the instant technology causes capture data 106 to be subsequently organized "in space". This allows issuing spatial queries on capture data 106 such as for retrieving capture data/content associated with or closest to a point or region of interest in space. In one embodiment, such a spatial query is issued by user 104 on montage 142 by clicking on a point or region of interest (in space) on an underlying floorplan/blueprint/architectural layout.

In other embodiments, a spatial query may be issued by specifying spatial coordinates or regions associated with points or areas of interest, and thus retrieving capture data 106 associated with or closest to the specified coordinates. For example, the query may be issued for retrieving capture data 106 associated with a region specified by $x_{min}$ to $x_{max}$, $y_{min}$ to $y_{max}$ (and even $z_{min}$ to $z_{min}$), where the min, max values specify a region of interest e.g., a living room, or an entrance. User 104 may also issue an unbounded query by specifying only one set of coordinates e.g. $x_{min}$ to $x_{max}$. Capture data 106 thus retrieved is preferably ordered using any ordering/sort criteria, such as in numerically ascending/descending order of the specified coordinates, or in any other order of desired architectural or presentation criteria. Per above, capture data 106 comprises (unordered) portions 106A-N of video data 108 and IMU data 112 shown.

Moreover, user 104 is also able to uploaded secondary images 125 from a secondary device 124. These also become a part of capture data 106 and get associated and become accessible at or near/close to the correct point or junction of montage 142 corresponding to the physical locations where the respective secondary images were taken. For an AEC application, montage 142 is the estimated path that is overlaid onto a blueprint for visualization. User 104 is able to click onto one of several points on the path to access the video footage of the corresponding area of the building, along with any secondary content including pictures and/or notes and/or voice memos from the point or near the point on the path that was clicked.

(2) Data Validation:

Let us now review the next stage or set of functions (2) in the instant FA workflow 150 presented above. In the preferred embodiments, these functions are afforded via instant computer application 170 discussed above in reference to FIG. 3. This computer application allows a user to perform a number of functions including data validation. Data validation entails ensuring that all data relevant to the capture sessions is present in the system as well as the organization and management of that data. Per above, the functions afforded by computer application 170 also include reporting/querying of montaging system 100, analyzing the data, among others.

For the purposes of data organization and management, we refer to walkthrough data as any data that is relevant to a walkthrough. For AEC embodiments, walkthrough data may also be referred to as inspection data. Thus, one objective of data validation is to ensure that all requisite inspection/walkthrough data is present in the system. Data validation comprises assigning and organizing capture data relevant to the walkthroughs. This includes data about the site or location where the walkthrough was performed, including any clerical information associated with the walkthrough. This also includes capture data 106 discussed in reference to FIG. 2 above and collected by capture apparatus 102 as well as any details about the capture apparatus or device(s) themselves.

Figure 7:
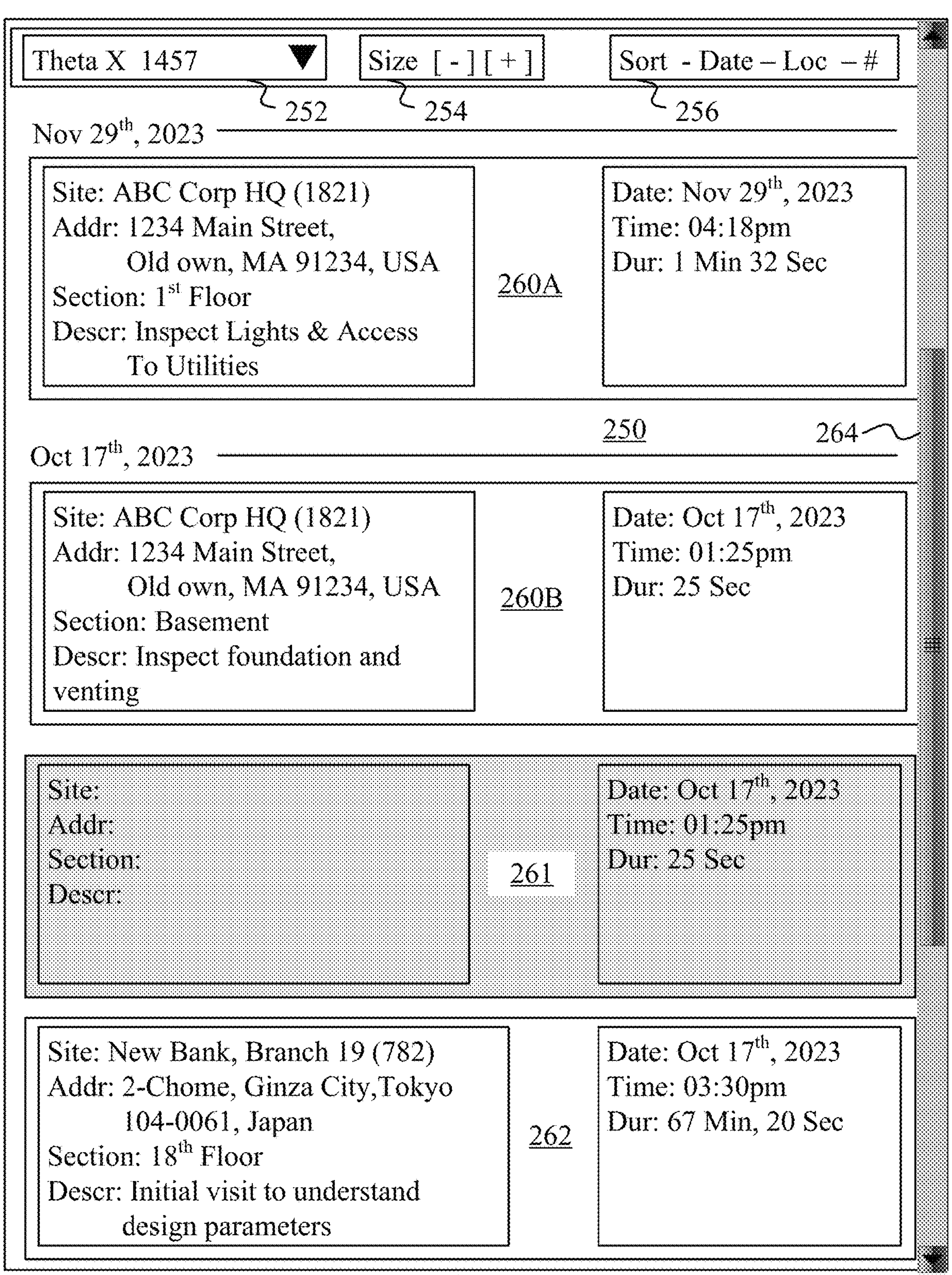
FIG. 7 shows an inspection dashboard mockup from an exemplary GUI of a computer application of the present montaging technology.

FIG. 7 shows inspection dashboard and more precisely its mockup 250 from an exemplary GUI of a computer application that provides inspection data organization and management for AEC embodiments. Exemplarily, the computer application is application 170 discussed in reference to FIG. 3. The computer application is preferably built as a web-application. As such, mockup/dashboard 250 is a webpage with familiar scrollbars, such as vertical scrollbar 264 as shown. Preferably, the computer application takes advantage of remote storage resources 116 and compute resources 122 in cloud 118 per FIG. 2 discussed above.

Inspection dashboard 250 shows the various inspections performed using the selected capture apparatus and presented according to various criteria. More specifically, inspection dashboard 250 shows the inspection data or simply inspections for short, performed using a device named Theta X 1457 as selected by the user using dropdown menu or box 252. The inspection data is sized using the sizing/zooming box 254 by the user and sorted using sorting box 256 as shown. The implementation of FIG. 7 shows the sort criteria implemented as data/time, location and the hashtags present in the data or extracted from its description.

The various inspections shown are inspections 260A and 260B belonging to the same project/site/address as well as inspection 262 belonging to a different project/site/address. The inspections shown occurred on two different dates, Nov. 29, 2023 and Oct. 17, 2023 as shown. Each inspection box in GUI dashboard 250 shows the name and address of the client/owner and project or site or building for each inspection along with a short description, duration, time, etc. of the individual inspection.

The objective of inspection dashboard 250 is to present inspection data of the various inspections to the user organized by criteria of user's choosing. In one embodiment, the inspections are grouped according to the device used to capture the data. In another embodiment, inspections are grouped according to the user. In a preferred embodiment, a multi-tenant approach is used where inspections are siloed and separated by user groups belonging to different organizations. In yet another embodiment, the inspections are sorted by the date of inspection. In another embodiment, inspections are searched by hashtags present or extracted from their description. In another embodiment, inspections are sorted by the project name or whether the inspections belong or not to a project. A practitioner will recognize that numerous criteria can thusly be used to sort, index or search inspections.

Inspections are useful once they are assigned or attributed to a project, and specifically to a page or folio of the project. Construction projects, for example, consist of several pages of blueprints, each for a different section or area of the building. A page or folio refers to a floor, wing, section, level, or area of the building. A page or folio may refer to a subsection of a larger area, such as a dining hall or lobby. In other words, a folio is a part of the facility that project management thinks is important enough to have its own blueprint.

In one embodiment, each project is assigned a name, address, and description. In another embodiment, each folio is also assigned a name and a description. In an embodiment, an inspection is assigned to a project by the user after capture (e.g., as part of Editing/Confirmation as discussed further herein). In the same or a related embodiment, camera devices are preassigned to specific projects or areas, in which case inspections are assigned to projects automatically. In yet another embodiment, inspections can be reassigned to different projects or assigned to multiple projects.

Any project shown in the inspection dashboard that has incomplete information e.g. it does not have a site information or it does not have an address or description is shown as greyed in dashboard 250. As such, project 261 is shown in grey in FIG. 7 because it does not yet have site information. In other words, it has not yet been assigned to a site or project. Therefore, the user can click on inspection box 261 and assign it to a project and/or enter any requisite information. This function of ensuring that all requisite information about an inspection has been entered into the system is accomplished in the present data validation stage of FA workflow 150.

In the preferred embodiment, the requisite data for an inspection includes site information, such as name, address, description and section information where the inspection(s) were performed. The requisite data also includes the floorplan or the blueprint of the sections or folios of the site where inspection(s) were performed.

Figure 8:
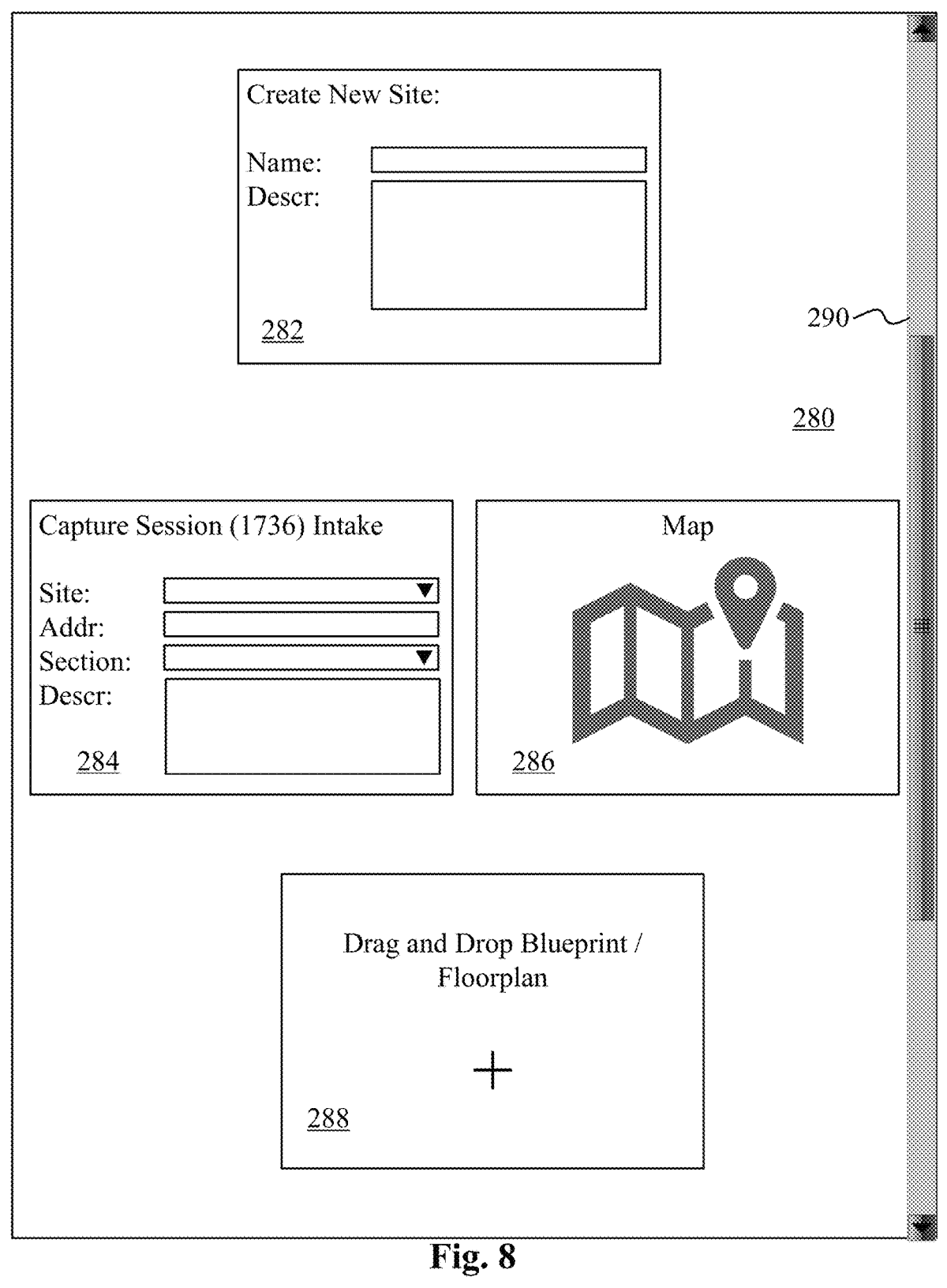

FIG. 8 shows a mockup 280 of the webpages from above-discussed computer application 170 responsible for the data validation tasks of FA workflow 150. Mockup 280 shows a web-based dialog box 284 using which a user can associate a capture session or inspection e.g. capture session 1736 shown in FIG. 8 to an existing Site using the shown dropdown menu. Once an existing site has been selected, the user can then select a section of the site from the dropdown menu shown. The user can also enter an address for the site using the map widget 286 as shown.

There is also a data entry form 282 using which a user can create a new site into the system if needed. The drag-and-drop box 288 allows user to add a blueprint/floorplan file for the selected section per dialog box 284 for capture session 1736. Thus, user has the option to enter any data associated with the inspection or capture session if it does not exist or to update/modify it if it already exists. Finally, there is the familiar vertical scrollbar 290 on webpage/mockup 280 as shown in FIG. 8. Depending on the width of webpage 280, there may also be a horizontal scrollbar and which is not shown in the view of FIG. 8.

The principles of data validation for AEC embodiments detailed above are easily extended to other applications of montaging system 100 of FIG. 2 according to the data requirements and characteristics of such applications.

(3) Estimating Velocity Profile and Positions of the Capture Apparatus:

Referring still to FIGS. 2-3, once above data validation tasks have been completed, system 100 is ready to estimate the positions of capture apparatus 102 carried by user/inspector 104 during a capture session in this stage (3) of FA workflow 150. Per above, for AEC embodiments, these positions trace a path of the capture apparatus during a walkthrough. The number crunching or the "heavy lift" performed in this present stage (3) of workflow 150 is preferably performed by a backend that is implemented on cloud compute resources 122 shown in FIG. 2.

The frontend is preferably provided by computer application 170 of FIG. 3 discussed above. Among others, the frontend functions provided by application 170 include initiating, pausing, and resuming the estimation of velocity profile and positions. The application preferably utilizes cloud storage resources 116 and cloud compute resources 122. Preferably, cloud compute resources 122 comprise a serverless architecture, such as the one provided by Amazon AWS® Lambda. Serverless code is event-driven, allowing for scaling to meet elastic demands. It is typically offered by a micro-billing pricing for which the practitioner only pays for the actual runtime used.

For AEC applications, computer application 170 in concert with the above-descried backend performs algorithmic analysis of capture data 106. It does so in order to estimate the positions of capture apparatus 102 during the walkthrough(s). For AEC, these positions trace or reconstruct the walkthrough path(s) of inspector 104 carrying apparatus 102. Path estimation is also sometimes referred to as path generation and is preferably implemented using a serverless computing architecture as noted above.

For many technical, environmental, user experiential and business reasons, sequential processing of video or image data 108 of FIG. 2 is not desirable. What is needed instead is a non-sequential approach where video data can be processed out-of-order, in parallel, and even with missing video data. Based on the instant principles, the positions/path of observer 104 and in turn capture apparatus 102 is/are not computed/estimated directly. Instead, the present design computes/estimates/generates a velocity profile of the capture apparatus first. It then computes/estimates/generates the positions/path through a constrained integration of the velocity profile.

In principle, if we have the velocity profile and a known (typically initial) position, we can then numerically integrate the velocity to compute position. However, any errors in velocity accumulate during numerical integration and this naïve approach of the prior art does not work. As per the present principles, if we have additional constraints, such as constraints 109 of FIG. 2 discussed above, that condition the motion of capture apparatus 102, we can then postulate the existence of an adjustment or variation signal that is added to the velocity profile.

These constraints can be derived from markings 107 applied to portions 106A-N of capture data 106, as well as any additional applied constraints. Exemplarily, constraints 109 include waypoint markings 107 designating start/end positions of the walkthrough discussed above. Constraints 109 also exemplarily include corrections entered by user 104 to the estimated positions of capture apparatus 102. Constraints 109 are also exemplarily derived from landmarks and fiducial markers as discussed above.

According to the instant design, the estimated velocity of capture apparatus 102 is discretized in a number of samples. In other words, the velocity is estimated in discrete samples, and the entire collection of such velocity samples is referred to as the velocity profile. If the velocity profile is "good" in the sense that the errors are more or less evenly distributed across capture data 106, then we can compute the most parsimonious adjustment/variation signal satisfying constraints 109.

In one embodiment, a parsimonious variation is modeled as minimizing the sum of squares of the adjustments of all samples of the velocity profile. In yet another embodiment, a parsimonious variation is modeled as minimizing the sum of weighted squares of the adjustments for all samples. In a variation of the above embodiment, the weights are proportional to the instant speed derived from the velocity profile.

In general, we cannot derive a "good" velocity profile by simply integrating numerically the accelerometer values of an IMU sensor, such as IMU 114 of FIG. 2 or IMU 206 of FIG. 4. This is bound to fail with real data, because any errors in acceleration will accumulate during numerical integration. The errors here are not just because of noise in the accelerometer readings. In fact, the main complication is due to gravity.

Accelerometers measure acceleration both due to gravity and due to accelerating motion. The latter is called linear acceleration in the IMU literature. To estimate linear acceleration, one must remove the effect of gravity. And to remove the effect of gravity one needs to estimate the orientation of the device with respect to the ground plane (perpendicular to the gravity of Earth).

The present approach first employs a State Estimator that processes IMU data 112 of FIG. 2 in order to estimate various properties of capture apparatus 102. These include angles $\phi$ (roll/tilt) and $\theta$ (pitch/pan, with respect to the ground plane) as well as yaw speed or angular velocity $d\phi/dt$ (about gravity). These also include gyro drift and linear acceleration in a floating reference plane that is parallel to the ground plane but rotated according to the (yet unknown) yaw. In a manner analogous to the discretization of the velocity profile above, the orientation is also measured in a discrete number of samples, and the entire collection of such samples is referred to as an orientation profile.

Given an estimate of yaw speed we again use constrained integration approach to recover yaw across the entire orientation profile if we have additional constraints 109. Such constraints 109 include known start/end locations or reference points, known headings or "compass points" at the project/site, amongst others. We can now also postulate the existence of an adjustment or variation signal that is added to the yaw speed profile. If the yaw speed profile is "good" in the sense that the errors are more or less evenly distributed among all orientation samples, then we can compute the most parsimonious adjustment or variation signal such that the above additional constraints 109 are satisfied.

In one embodiment, a parsimonious variation is modeled as minimizing the sum of squares of the adjustments of all samples. In another embodiment, a parsimonious variation is modeled as minimizing the sum of weighted squares of the adjustments for all samples. In a variation of the above embodiment, the weights are proportional to the instant yaw speed derived from state estimator.

So, now we have orientation estimates for pan, tilt, and yaw across the entire orientation profile (i.e., all samples). We can use these orientation estimates to remove the effect of gravity and estimate the linear acceleration across the orientation profile. One might then be tempted to again perform constrained integration to produce velocity. But the linear acceleration estimates are not "good" in the sense that errors are not evenly distributed and cannot be corrected by simply computing a parsimonious adjustment or variation.

Depending on the embodiment, now optical adjustments are employed to improve the signal. Explained further, we divide the inspection footage into video blocks of short duration (e.g., 1 seconds or 2 seconds), but not necessarily of constant duration across all portions of video that are available. Recall that a subset of portions 106A-N of capture data 106 may be selected whether due to technical necessity or by user choice to be included in this downstream processing. That is, there are time periods without any video blocks. Thus, the video blocks do not necessarily form an uninterrupted sequence.

Now, each video block is processed as follows:

(a) frames are extracted from video using known techniques, (b) features are detected and tracked across frames using known computer vision techniques, and (c) structure from small motion (SfSM) based on the present design is computed.

SfSM produces a local estimate of the camera motion and a (typically sparse) three-dimensional (3D) point cloud with respect to the first camera position. Both the local motion estimate and 3D points are relative to each other and lack absolute or physical scale. Now we compute a velocity estimate for each video block. We perform a joint optimization per video block comprising of the following steps:

1. The SfSM local motion with respect to the first camera position for the given video block is computed.
2. The orientation estimates are computed as explained above.
3. Accelerations in the body reference frame of the capture apparatus/unit are measured.
4. Through joint optimization, we find the instant velocities, pan/tilt with small variations and local scale such that the SfSM output agrees with the local kinematic path computed through numerical integration over the video block duration. We call this step the SfSM+KIN joint optimization.

The output of the above is a velocity estimate for each video block processed.

We now have a set of velocity estimates per video block computed using optical information. However, these estimates are not dense. The final step is to compute the full velocity profile using these sparse set of estimates in conjunction with the orientation estimates and optionally the accelerations in the body reference frame. There are a number of approaches of solving this reconstruction problem, such as using interpolating splines, statistical techniques and machine learning approaches.

As a key contribution to the field, the present design can process video/image blocks out-of-order or independently or in parallel, skip blocks to save computation and/or bandwidth, and ignore missing video/image data. This non-sequential or parallel or independent processing of blocks of capture data 106 is a key contribution afforded by instant non-sequential or sparse or discontinuous or piecewise VIO. As a further capability of the present non-sequential design, recall the above discussion about unordered or out-of-order portions 106A-N of non-sequential capture data 106. To summarize, the present non-sequential design affords non-sequential capabilities not only to the collection of capture data 106 as well as to its (downstream) data processing.

The main distinguishing features of the present non-sequential VIO include:

1. SfSM blocks are processed independently of each other.
2. Velocity estimates per video block are also computed independently of each other.
3. The velocity profile is computed from a sparse set of velocity estimates from (2) above. These velocity estimates may be expressed as ($v_x$, $v_y$, $v_z$) for each discrete sample of the velocity profile.

The final estimate of the walkthrough positions of capture apparatus 102 also includes orientation of the camera(s). That is to say that the final path estimated using the instant non-sequential visual inertial odometry (VIO) includes the full pose of each camera.

Intuitively, the "visual" component of capture data 106 of FIG. 2 i.e. video data 108 provides velocity reset or correction information although it may do so sparsely. In general, there can be other sources of velocity resets or corrections that may also be sparse. In one embodiment, user 104 indicates via waypoint markings 107 known stops or pauses which are de facto velocity estimates of zero. In another embodiment, the stops or pauses are detected automatically based on a motion saliency signal derived from raw IMU data. In yet another embodiment, the velocity estimates can be produced by a second vision process using a technique distinct from SfSM, such as "optical flow" as known in the art.

The estimated positions of capture apparatus 102 using the present non-sequential techniques can be used for a variety of purposes other than field automation (FA). They can be used for organizing or locating captured data/content 106 in general, and on a blueprint or a floorplan in particular. As noted above, the set of estimated positions trace a path of the capture apparatus and that is desirable for an AEC application or for any application for which estimating such a path is useful.

In other applications of the present techniques, the set of estimated positions is sparse and spatially arranged to be navigation points in a 360 virtual panoramic tour of capture data 106 as montage 142. Montage or spatial/visual composition/presentation/representation or visualization or arrangement 142 may be driven by UI/UX considerations completely unrelated to the walkthrough order. Simply put, the set of estimated positions can be used for creating any desired montage 142 for emulating a virtual scanning device using manifold stitching techniques.

Depending on the embodiment, montage 142 of FIG. 2 may be a virtual fly-through and/or a hyperlapse. It can also be used for producing high-quality 3D measurements by post-processing the video data with stereo-based techniques using the estimated path as a prior evidence or belief. Another embodiment uses the estimated path and the collection of sparse 3D point clouds from the processed SfSM video blocks to compute dense 3D data through depth densification.

To recapitulate, walkthrough positions/path estimation/generation based on instant non-sequential VIO comprises of the following sets of operations:

1. Process IMU data and compute an initial kinematic profile (KIN):
   a. Using the instant state estimator discussed above, estimates are computed for pan/tilt (with respect to the ground plane), yaw speed (about gravity), gyro drift and linear acceleration in a floating reference plane parallel to the ground plane but rotated according to the (yet unknown) yaw.

b. From the initial or final heading that may be determined automatically, or entered manually, yaw is recovered across the orientation profile through constrained integration per above.

c. Given the estimate for yaw, linear acceleration is computed with respect to the absolute reference frame. In one embodiment, the absolute reference frame is parallel to the ground plane with origin set at the initial position of the inspection/walkthrough.

d. Using waypoint information, determine the time instants for walkthrough stops or pauses. This step can be augmented through motion saliency analysis to detect pauses that were not explicitly indicated by the user.

e. By enforcing the constraint that linear velocity should be zero at the stop instants, velocity is estimated through constrained integration across the velocity profile.

f. The results of (a) through (e) comprise the initial kinematic profile (KIN).

2. Process the video data in video blocks of short duration. Per above, this duration may be 1 seconds to 2 seconds, but does not necessarily need to be constant across all the video blocks. The video blocks do not necessarily form an uninterrupted sequence.

For each block, perform the following operations:

a. Extract frames.

b. Detect and track features for the duration of the block.

c. Compute structure from small motion (SfSM) per above.

As already noted, video blocks can be processed independently and concurrently. In a preferred embodiment, this is accomplished using a serverless computing architecture. An exemplary implementation utilizing such serverless cloud computing resources is indicated by reference numeral 122 in FIG. 2. Serverless vendors offer compute runtimes, also known as Function as a Service (FaaS) platforms (e.g., Amazon AWS® Lambda).

In one embodiment, a function is defined for each type of block operation (i.e., frame extraction, feature extraction and SfSM). According to key aspects, multiple instances of each function can be launched simultaneously to process the blocks concurrently. In another embodiment, a task queue is associated to each block allowing sequencing of tasks. This allows all block operations to be triggered by a single action.

3. Through SfSM+KIN joint optimization, compute a sparse set of instant velocities, pan/tilt with small variations and local scale such that the SfSM output agrees with the local kinematic path over the video block duration.

4. The full velocity profile is reconstructed using the sparse set of instant velocities in conjunction with the orientation estimates and optionally the accelerations in the body reference frame. Estimation of the walkthrough positions/path is performed through constrained integration based on constraints 109. Such constraints 109 conditioning the motion of capture apparatus 102 may be derived in a number of ways and from a number of sources including presentation requirements of spatial/visual composition/presentation/representation/montage 142. We now have a set of estimated positions of moving capture apparatus 102 that was carried by a user, such as user/inspector 104 of FIG. 2.

(4) Produce a Montage or Visual Composition Based on the Positions of the Capture Apparatus:

While still referring to FIGS. 2-3 and related discussion, let us now review the next stage or set of functions (4) of our FA workflow 150. In some embodiments, including real-estate embodiments, the set of positions of the capture apparatus are used for placing panoramic images to create a 360 virtual tour. In other embodiments, including real-estate embodiments, the set of positions may trace a path of the capture apparatus and the path is then fitted to a floorplan of a house or building.

Based on its non-sequential design, the present technology is able to aggregate/combine unordered portions 106A-N of capture data 106 in the order most advantageous to a desired montage 142. Therefore, as another example, observer 104 may decide to perform a walkthrough of a bedroom first, and then the living room and the kitchen, and then the garage. Then, the montaging of capture data into the desired montage may consist of a hyperlapse visualization starting at the living room and kitchen, moving into the bedrooms, and ending at the bathrooms. The present technology can organize portions of capture data 106 from the order that they were captured "in time" i.e. 106A, 106B and 106C to arrive at an aggregated hyperlapse path that is organized "in space" or "in presentation space" i.e. 106B, 106A, 106C. Such a hyperlapse is useful for real-estate or other applications.

Note, that floorplan is the commonly used term in real-estate, while blueprint is more commonly employed in AEC. In the case of AEC embodiments, the set of estimated positions trace the walkthrough path. The set of positions of the capture apparatus estimated/generated above is then algorithmically fit/fitted to the blueprint of the site section or folio where the inspection was performed.

We will now describe the process of producing montage 142 for such AEC embodiments by fitting the path to a blueprint. However, the techniques described below can be extended to other embodiments in general for producing visual montages based on the set of estimated positions of capture apparatus 102.

The present design recognizes that in practical terms, the blueprint is at best an "aspirational" representation of the reality of a site/section, and not the actual reality. Unlike the techniques of the prior art, it therefore applies the walkthrough path or simply path to the blueprint holistically and not locally. Therefore, in some embodiments, user inputs are utilized by the instant algorithm to ensure the best fit to the blueprint.

The fitting algorithm comprises the following set of actions in order to achieve its objectives.

1. Apply constraints 109: Per above, we state that constraints 109 condition the motion of capture apparatus 102. A base constraint is applied to the first and the last positions i.e. the start/starting point and the end/ending point of the walkthrough.

The base constraint sets the starting point and ending point of the walkthrough at respective specific locations on the underlying blueprint. Of course, these locations on the blueprint ultimately map to specific physical locations at the site. In one embodiment, the base constraint requires that the starting and ending positions be the same, thus forming a closed-loop walkthrough.

In the same or a related embodiment, additional constraints 109 are applied based on cues or hints originating from a variety of sources. For example, observer/operator 104 may visit predefined checkpoints (e.g. entrance/exit) at the site during the walkthrough. These checkpoints thus apply constraints conditioning the motion of the operator during the walkthrough because we know the true position/location of the observer at those checkpoints.

In the same or a related embodiment, additional constraints 109 are derived from optical fiducial markers or landmarks or reference points or checkpoints at known locations at the site. These fiducial markers/landmarks can be detected by the camera using computer vision techniques, and their locations can already be known or determined through triangulation or trilateration techniques.

These fiducial markers or landmarks are thus used as a basis to apply constraints 109 conditioning the motion of capture apparatus 102 because its true positions/locations at those markers/landmarks are known. Similarly, constraints 109 conditioning the motion of capture apparatus 102 may be based on known headings or compass points at the project/site. This is because the true orientation of the capture apparatus at those points is known.

Still other constraints 109 conditioning the motion of capture apparatus 102 based on the presentation requirements of montage 142 may be applied. For example, a user can enter corrections as per step (6) below to fit estimated positions/path of capture apparatus 102 to a distorted floorplan or a hand-drawn blueprint. The user can do that by placing appropriate checkpoints on the underlying floorplan/blueprint.

Figure 9:
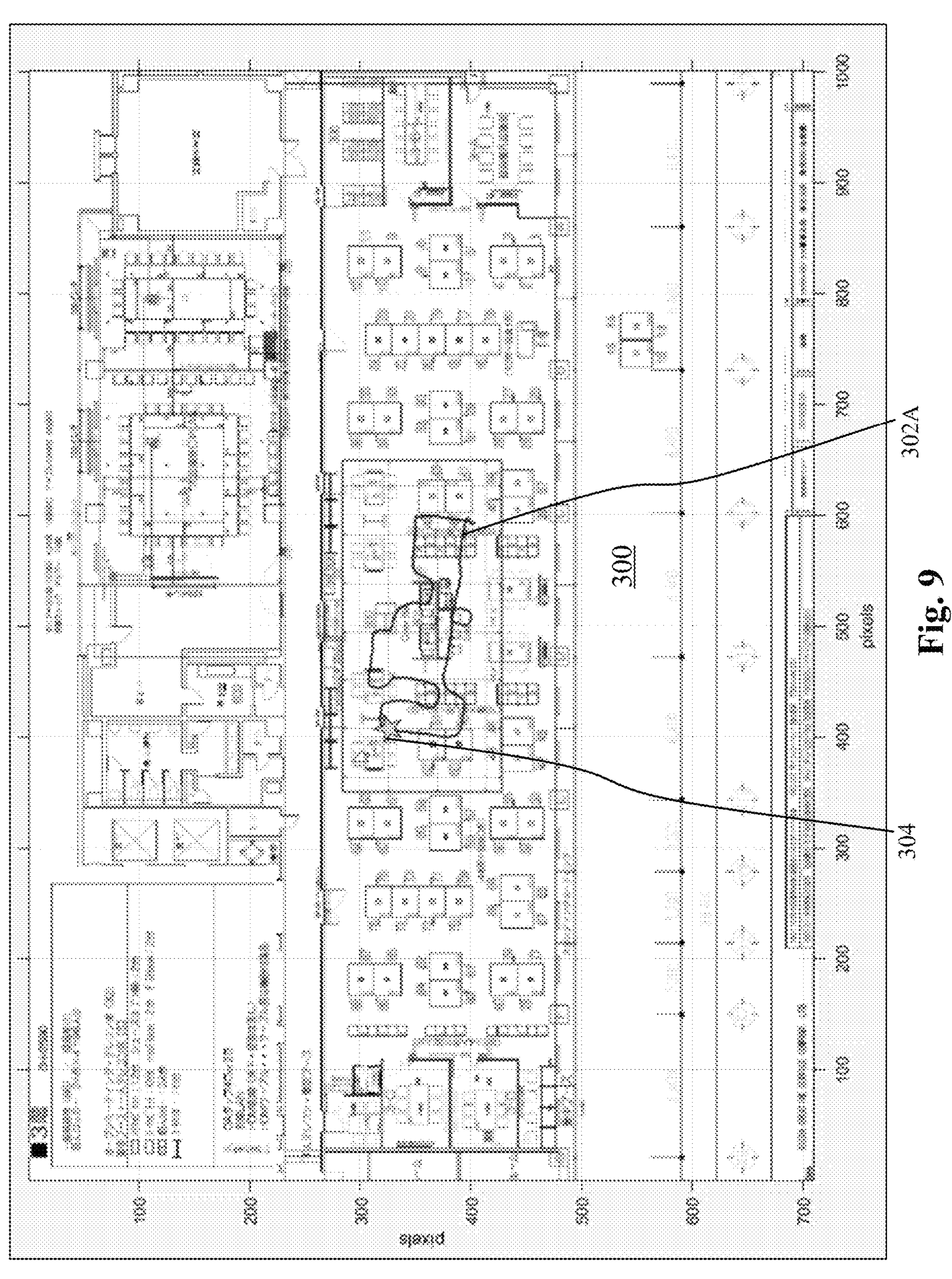
FIG. 9 shows an exemplary blueprint overlaid with an exemplary path estimated using the instant non-sequential VIO.

2. Compute velocity profile: The velocity profile consists of the velocity of capture apparatus 102 computed at every time instant of the walkthrough path. Depending on the embodiment, the time instant can be at any practical level of granularity such as a every few seconds, every second or even lower.
3. Determine initial scale: Determine an initial scale based on integration of the initial velocity profile. FIG. 9 shows an exemplary blueprint 300 overlaid with an exemplary path 302A with an initial scale as shown. A yellow star in FIG. 9 represented by reference numeral 304 marks the starting point for the path.
4. Compute velocity adjustments: From here on, the values of the velocity in the velocity profile are adjusted in order to satisfy constraints 109 set above. This is a variational problem, where the goal is to find adjusted velocities satisfying applied constraints 109 after integration.

In one embodiment, these adjustments are multiplicative factors applied to the pre-adjusted velocity values i.e., each velocity value is adjusted by scaling up or down its original value.

In a preferred embodiment, the velocity adjustments are determined by minimizing a minimum norm defined over the aggregate of the velocity adjustments. A minimum norm solution can be effectively found using Moore-Penrose inverse (also known as pseudoinverse) when the norm is the L2 norm. This then becomes a linear problem. In another embodiment, the multiplicative factors are required to be non-negative, and the problem can be solved using linear programming techniques for the L1-norm case or by quadratic programming techniques for the L2-norm case.

Figure 10:
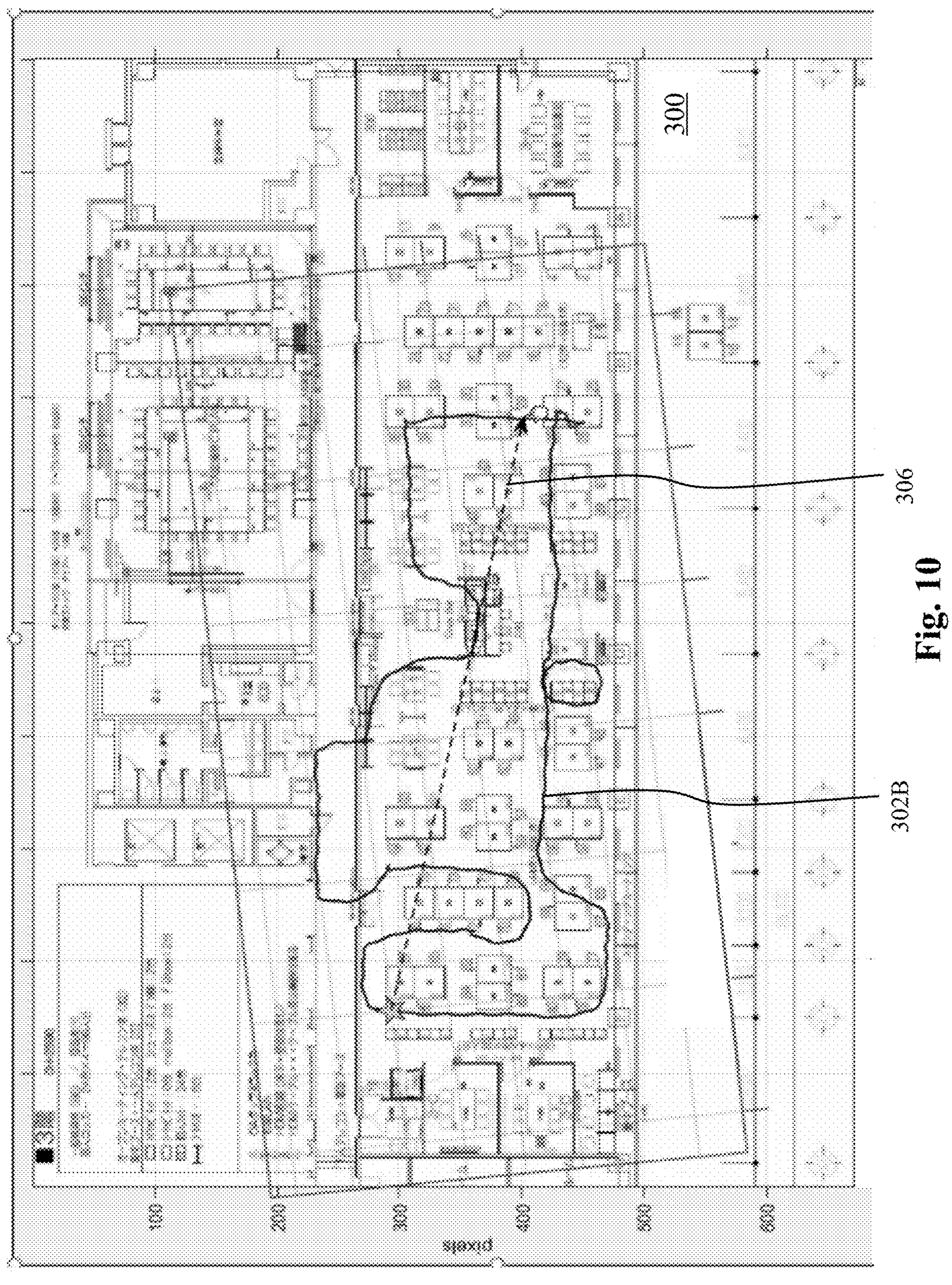
FIG. 10 shows the blueprint of FIG. 9 with the path being scaled and rotated based on user input/corrections.

Initially, only the base constraint set above is enforced, and the adjusted velocities yield an initial estimate of the walkthrough path. FIG. 10 shows blueprint 300 of FIG. 9 where the user is using dashed line 306 to scale and rotate this initial estimated path 302A of FIG. 9 in order to arrive at placement 302B of FIG. 10. Not all elements from FIG. 9 are marked in FIG. 10 to avoid clutter.

Figure 11:
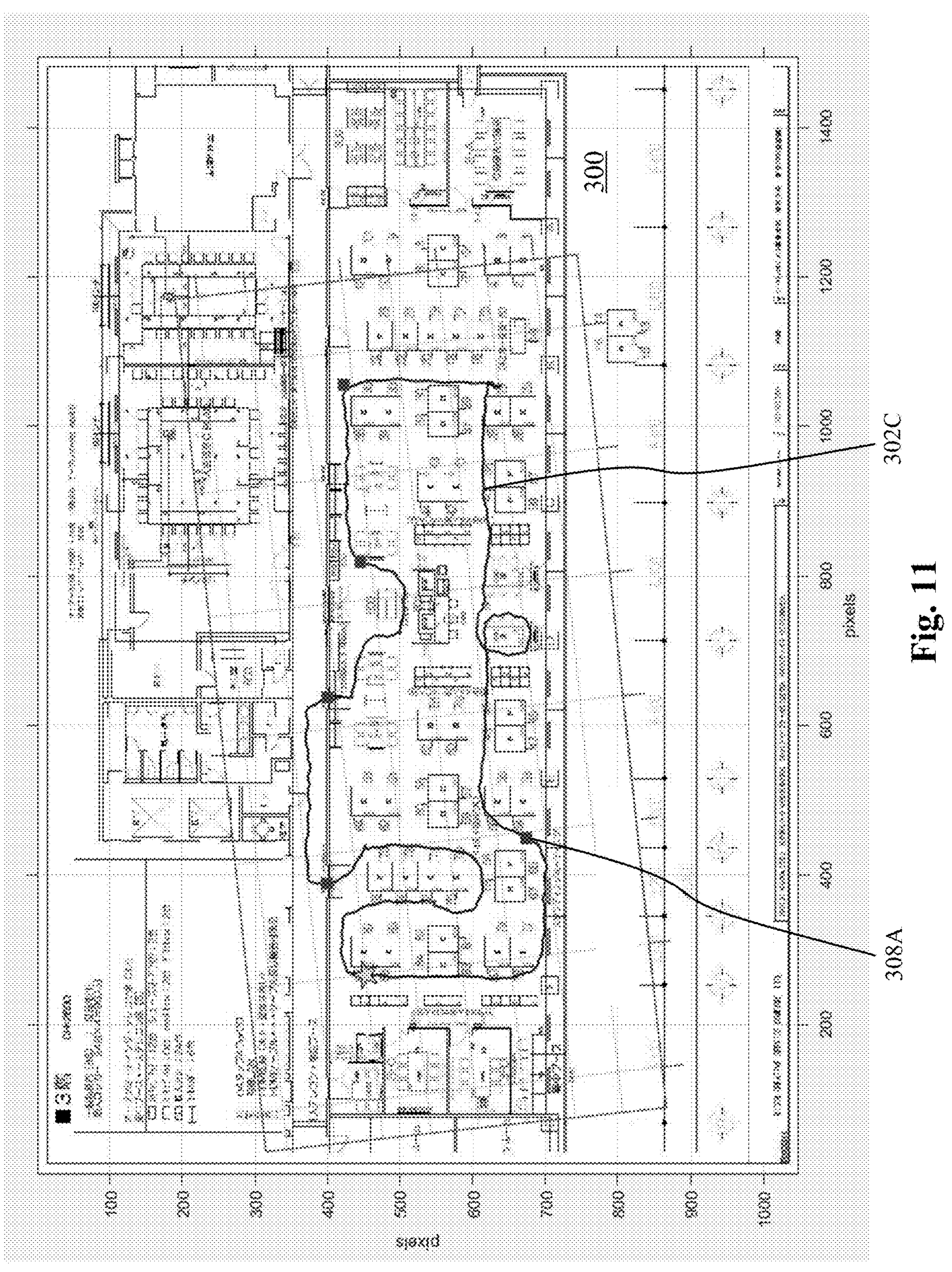
FIG. 11 shows the blueprint and path of FIG. 9-10 with the corrections being made by the user.

This step of computing velocity adjustments is repeated whenever any of constraints 109 changes. In one embodiment, new constraints 109 are added based on interactive corrections provided/entered by the user (see Step 6 below).
5. Compute confidence measure: A confidence measure is determined based on the quality of results of the SfSM+KIN joint optimization described earlier. If the agreement between SfSM and KIN analysis was higher, the confidence measure is higher and vice versa. The confidence measure is used to weight the scale changes above. In other words, more forceful or higher adjustments to velocity are required in sections or areas where the confidence measure is lower.
6. Apply corrections and perform fitting: In the preferred embodiment, the corrections are based on manual inputs by the user. FIG. 11 shows blueprint 300 and estimated walkthrough path of FIG. 9-10 for the embodiments where the corrections are made/entered by the user. The correction points are shown by small squares/dots 308 in FIG. 11. As needed, the user drags the squares to adjust/correct the path around blueprint 300. Only one such square is marked by reference numeral 308A to avoid clutter. As a benefit of the present technology, a handful or very few of such corrections or cues are needed from the user to obtain an acceptable fit of the path to the blueprint.

Based on the corrections, new constraints 109 are obtained. Further, new/adjusted velocities are calculated as described in step (4) above, a new corrected path is computed through integration of the newly adjusted velocities, and the above process is repeated until a final or acceptable fit is obtained. Note that when integrated, the adjusted velocities are required to satisfy the base constraint above. FIG. 11 shows such a final fit of walkthrough path 302C to blueprint 300 of FIG. 9-10. Again, not all elements from FIG. 9-10 are marked in FIG. 11 for clarity.

In alternative embodiments, the corrections may also be derived programmatically. For example, a set of noteworthy checkpoints or reference points is determined beforehand through automatic analysis of architectural floorplans. Such analysis computes a set of expected visual elements at each checkpoint, which are in turn detected and recognized by the camera using computer vision techniques. See "Automatic floor plan analysis and recognition" by Pizarro et al. (Journal of Automation in Construction, Vol. 140, 2022) for a review of automatic procedures for analyzing architectural floor plans of raster images. The path is then programmatically fit to the blueprint based on these checkpoints.

(5) Additional Reporting and Analysis:

In this stage or set of functions (5) of FA workflow 150, the user can perform additional reporting and analysis in montaging system 100 of FIG. 2, after a desired montage 142 of captured data 106 has been obtained per above. For the AEC embodiments discussed above, the montage took the form of a walkthrough path fitted to a blueprint. Note, that this stage (5) and prior stage (4) of the workflow may overlap in terms of user experience and functional details depending on the implementation. In either case, based on the instant design, user 104 can query the system and generate a variety of reports from montaging system 100.

An exemplary report for AEC embodiments is illustrated in FIG. 12. More specifically, FIG. 12 shows a blueprint/floorplan 310 onto which a reported path 312 of an inspection has been overlaid based on the above teachings. Relevant inspection data is shown in text box 316. Each circle or point on path 312 is clickable. Only two such circles are explicitly marked by reference numerals 314A and 314N to avoid clutter. Once the user selects a circle along the path, the instant system opens a modal window displaying the relevant content. FIG. 13 presents such an exemplary modal window showing a 360-degree view 320 associated with a particular circle/point on path 312 of FIG. 12.

Recall from above that the objective of montaging is the creation of a montage or the production/generation of suitable visual composition of captured content 106. The report in FIG. 12 is truly a montage of captured data 106 discussed in reference to FIG. 2. In fact, path 312 shown in FIG. 12 is a "reported path" and may not entirely correspond to the physical walkthrough performed by observer/user/operator 104. Such a path that would correspond completely to the walkthrough may be excessively dense and contain "knots" and "wiggles" that are distracting.

Therefore, reported path 312 shown in FIG. 12 is a decimated version of the original walkthrough path, where the decimation occurs along an arc-length (not time). The decimation is also responsive to the pixel size of the drawn circles 314. As a result, drawn circles 314 never overlap and can be clicked easily by the user. Reported path 312 in FIG. 12 also acts as a visual navigation tool for the user to interact with the 360-degree content. In one embodiment, reported path 312 is a reduced set of locations at key areas of the blueprint and the report is a 360 virtual tour. In another embodiment, the blueprint is organized in a grid layout, and only one location is selected per grid.

In yet another embodiment, the system allows the user to create shareable and obfuscated links to the final report, such as the one shown in FIG. 12. After sharing, the shareable links may also be preferably revoked by the user. FIG. 14 shows montage 142 from an embodiment that allows the user to upload secondary photos 125 captured with a supplementary device 124 (e.g., a smartphone) and associate these with an inspection per above teachings. More specifically, FIG. 14 shows blueprint 310 of FIG. 12 with a gallery of secondary photographs or pictures 125. One such picture 330A is marked explicitly for clarity. The montage of FIG. 14 may be referred to and accessed as a report from system 100. Upon clicking on a picture, a modal window displays a larger version of the photograph, such as the one shown in FIG. 13. Not all the elements from FIG. 13 are marked in FIG. 14 to avoid clutter.

In other embodiments, the user can query the system for content based on the location of the inspections, by time, by a capture session id, by a drop pin, among other search/query criteria. A drop pin is a GUI widget afforded by the present technology to mark a point on a reported path on the blueprint. Once a user clicks on the drop pin, any relevant data associated with the location on the section/site at or near that drop pin is displayed to the user in a modal window. This data includes capture data (including any secondary data), and preferably any other ancillary data as needed.

In a logistics/warehousing embodiment of the present technology, observer/operator/user 104 of FIG. 2 performs a partial or complete walkthrough of a warehouse 140 in order to analyze the stocking and picking quality/habits of warehouse employees. This is very useful because it is impractical or unpalatable to instrument cameras throughout a warehouse. Once the walkthrough has been done, then the user can easily generate a montage or a report from montaging system 100 and more specifically from its computer application 170.

In one embodiment, montage/report 142 comprises a path of the user overlaid onto the floorplan of the warehouse per above teachings. In another embodiment, montage 142 is based on a set of positions overlaid on a grid layout representing the aisles and bins of the warehouse without overlaying the walkthrough path. A user can now conveniently click on a circle at or near a desired bin in the warehouse to retrieve a video or secondary content/pictures showing how the bin is being stocked or picked.

In view of the above teachings, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A montaging system comprising:

(a) a capture apparatus containing a camera and an inertial measurement unit (IMU);

(b) computer-readable instructions stored in a non-transitory storage medium and at least one microprocessor coupled to said non-transitory storage medium for executing said computer-readable instructions, said at least one microprocessor configured to:

collect one or more portions of capture data produced by said capture apparatus carried by a user undergoing motion at a site during a capture session;

allow said user to apply one or more markings to said one or more portions;

apply one or more constraints conditioning said motion;

perform an estimation of a velocity profile of said capture apparatus from said one or more portions by employing non-sequential visual inertial odometry (VIO) and by utilizing said one or more markings;

determine a plurality of positions of said capture apparatus by performing a constrained integration of said velocity profile based on said one or more constraints; and produce a montage of said capture data based on said plurality of positions.

2. The montaging system of claim 1, wherein said at least one microprocessor is further configured to store said one or more portions locally on said capture apparatus and then upload them to a remote storage location.

3. The montaging system of claim 2, wherein a portion amongst said one or more portions is skipped from uploading to said remote storage location based on said one or more markings.

4. The montaging system of claim 1, wherein said one or more markings comprise a waypoint entered by said user.

5. The montaging system of claim 1, wherein said one or more constraints are based on one or more elements of a group including said one or more markings, a correction entered by said user, a reference point derived from a fiducial marker at said site, a pause detected in said motion, and a known compass point at said site.

6. The montaging system of claim 1, wherein said one or more portions are first ordered in accordance with said montage before said estimation.

7. The montaging system of claim 1, wherein said camera is a 360-degree camera and wherein said montage is a 360-degree virtual tour.

8. The montaging system of claim 1, wherein said montage is a hyperlapse.

9. The montaging system of claim 1, wherein said capture apparatus is head-mounted onto said user during said capture session.

10. The montaging system of claim 1, further comprising a companion device for issuing commands to said capture apparatus, said companion device carried by said user during said capture session.

11. The montaging system of claim 10, wherein said companion device is one of a smartwatch, a smartphone, a wearable device, a tablet, a laptop, a personal digital assistant (PDA), and a mobile computing device.

12. The montaging system of claim 1, wherein said camera is in an array of cameras contained in said capture apparatus, said array of cameras producing a 360-degree video footage contained in said capture data.

13. The montaging system of claim 1, wherein said at least one microprocessor is further configured to enable said user to include one or both of pictures and notes in said capture data, said pictures and notes taken using a secondary device carried by said user during said capture session.

14. The montaging system of claim 1, wherein said capture apparatus is an on-off device (OOD) and wherein said one or more markings comprise a start and an end entered by said user concurrently with the start and the end of said capture session respectively.

15. The montaging system of claim 1, wherein said capture apparatus is an always-on device (AOD) and wherein said one or more markings comprise a start and an end of said capture session entered retrospectively by said user after said capture session.

16. The montaging system of claim 1, wherein said capture session is an inspection performed by said user at said site and wherein said plurality of positions trace a path of said user traversed during said inspection.

17. The montaging system of claim 16, wherein said montage comprises said path fitted to a blueprint of said site.

18. The montaging system of claim 16, wherein said at least one microprocessor is further configured to enable said user to perform an assignment of said inspection to said site.

19. A montaging system comprising:

(a) one or more capture apparatus each containing a camera and an inertial measurement unit (IMU);

(b) computer-readable instructions stored in non-transitory storage media and at least one microprocessor coupled to said non-transitory storage media for executing said computer-readable instructions, said at least one microprocessor configured to:

collect one or more portions of capture data produced by each of said one or more capture apparatus carried by one or more respective users each undergoing motion at a site during a capture session;

allow said one or more respective users to apply one or more markings to said one or more portions;

apply one or more constraints conditioning said motion;

perform an estimation of a velocity profile of each of said capture apparatus from said one or more portions by employing non-sequential visual inertial odometry (VIO) and by utilizing said one or more markings;

determine a plurality of positions of each of said capture apparatus by performing a constrained integration of said velocity profile based on said one or more constraints; and produce a montage of said capture data based on said plurality of positions.

20. A computer-implemented montaging method comprising the steps of:

(a) collecting one or more portions of capture data produced by a capture apparatus carried by a user undergoing motion at a site during a capture session, said capture apparatus comprising a camera and an inertial measurement unit (IMU);

(b) applying one or more markings by said user to said one or more portions;

(c) applying one or more constraints conditioning said motion;

(d) estimating a velocity profile of said capture apparatus from said one or more portions by employing non-sequential visual inertial odometry (VIO) and by utilizing said one or more markings;

(e) determining a plurality of positions of said capture apparatus by performing a constrained integration of said velocity profile based on said one or more constraints; and (f) producing a montage of said capture data based on said plurality of positions.

21. The computer-implemented montaging method of claim 20, excluding a portion amongst said one or more portions from said montage based on said one or more markings.

22. The computer-implemented montaging method of claim 20, providing said one or more markings to comprise a waypoint marking.

23. The computer-implemented montaging method of claim 20, basing said one or more constraints on one or more elements of a group containing said one or more markings, a correction entered by said user, a reference point derived from a landmark at said site, a pause detected in said motion, and a known heading at said site.

24. The computer-implemented montaging method of claim 20, ordering said one or more portions according to said montage before said step (d).

25. The computer-implemented montaging method of claim 20, wherein said capture session is an inspection performed by said user at said site and wherein said plurality of positions trace a path of said user travelled during said inspection.

26. The computer-implemented montaging method of claim 25, fitting said path to a blueprint of said site for said montage.

27. The computer-implemented montaging method of claim 26, basing said fitting on a confidence measure deriving from said non-sequential VIO.

* * * * *